United States Patent
Katagami et al.

(10) Patent No.: US 7,259,814 B2
(45) Date of Patent: *Aug. 21, 2007

(54) COLOR FILTER SUBSTRATE HAVING REFLECTING AND TRANSMITTING COMPONENTS, LIQUID CRYSTAL DISPLAY DEVICE HAVING THE SAME, AND ELECTRONIC DEVICE HAVING THE SAME

(75) Inventors: Satoru Katagami, Hara-mura (JP); Toshihiro Ushiyama, Chino (JP); Hisashi Aruga, Fujimi-machi (JP)

(73) Assignee: Seiko Epson Corporation, Tokyo (JP)

(*) Notice: Subject to any disclaimer, the term of this patent is extended or adjusted under 35 U.S.C. 154(b) by 197 days.

This patent is subject to a terminal disclaimer.

(21) Appl. No.: 10/925,215

(22) Filed: Aug. 25, 2004

(65) Prior Publication Data
US 2005/0063081 A1 Mar. 24, 2005

(30) Foreign Application Priority Data

| Aug. 28, 2003 | (JP) | ............................. 2003-304566 |
| Aug. 28, 2003 | (JP) | ............................. 2003-304659 |
| Jun. 16, 2004 | (JP) | ............................. 2004-178378 |

(51) Int. Cl.
*G02F 1/1335* (2006.01)

(52) U.S. Cl. ..................... 349/114; 349/106; 349/113; 349/187

(58) Field of Classification Search ................ 349/114
See application file for complete search history.

(56) References Cited

U.S. PATENT DOCUMENTS

| 6,195,140 | B1* | 2/2001 | Kubo et al. .................... 349/44 |
| 6,798,473 | B2* | 9/2004 | Kaneda et al. .............. 349/106 |
| 6,801,274 | B2* | 10/2004 | Suzuki ....................... 349/106 |
| 6,870,584 | B2 | 3/2005 | Kawase et al. |
| 6,887,631 | B2 | 5/2005 | Kiguchi et al. |
| 7,029,807 | B2* | 4/2006 | Sakurada et al. .............. 430/7 |
| 2003/0016459 | A1* | 1/2003 | Takizawa et al. ........... 359/885 |
| 2004/0096595 | A1* | 5/2004 | Otagiri et al. ............. 428/1.31 |
| 2004/0183971 | A1* | 9/2004 | Fukuchi ...................... 349/114 |
| 2005/0024599 | A1 | 2/2005 | Katagami et al. |
| 2005/0062911 | A1* | 3/2005 | Ushiyama et al. .......... 349/114 |

FOREIGN PATENT DOCUMENTS

CN 1365891 A 8/2002

(Continued)

*Primary Examiner*—Andrew Schechter
(74) *Attorney, Agent, or Firm*—Global IP Counselors, LLP

(57) ABSTRACT

A color filter substrate includes first and second layers having openings, a filter layer located in the openings, a reflecting component, and a transmitting component. The reflecting component is provided at least partially on a second side of the filter layer such that first light rays that are incident on the filter layer from a first side are reflected to the first side, where the first side is an opposite side of the second side. The transmitting component is provided at least partially on the second side of the filter layer, such that second light rays that are incident on the filter layer from the second side are emitted to the first side. The present invention provides a color filter substrate, a liquid crystal display device, and an electronic device having a structure that allows good coating with a liquid material.

8 Claims, 17 Drawing Sheets

FOREIGN PATENT DOCUMENTS

| | | |
|---|---|---|
| CN | 1389745 A | 1/2003 |
| CN | 1397820 A | 2/2003 |
| EP | 1225472 A | 7/2002 |
| JP | H09-329706 A | 12/1997 |
| JP | 10-260307 A | 9/1998 |
| JP | H11-194211 A | 7/1999 |
| JP | 2001-033778 A | 2/2001 |
| JP | 2001-066416 A | 3/2001 |
| JP | 2003-121635 | 4/2003 |
| KR | 2003-0003078 | 1/2003 |
| KR | 2003-0029631 | 4/2003 |
| WO | WO 0037972 A1 * | 6/2000 |

* cited by examiner

COLOR FILTER SUBSTRATE HAVING REFLECTING AND TRANSMITTING COMPONENTS, LIQUID CRYSTAL DISPLAY DEVICE HAVING THE SAME, AND ELECTRONIC DEVICE HAVING THE SAME

BACKGROUND OF THE INVENTION

1. Field of the Invention

The present invention relates to a color filter substrate. More specifically, the present invention relates to a color filter substrate that is favorable for a liquid crystal display device equipped with a transmitting component and a reflecting component in a single pixel region.

2. Background Information

There are known apparatuses for manufacturing color filters by discharging color filter ink droplets from an inkjet head onto a color filter substrate. See for example Japanese Laid-Open Patent Application H10-260307.

A transflective liquid crystal display device is also known. See for example FIGS. 1 and 2 of Japanese Laid-Open Patent Application 2000-33778. A transflective liquid crystal display device can concurrently perform display in a reflective display mode, in which the display is performed by reflecting external light such as natural light or light from indoor lighting, and display in a transmissive display mode, in which the display is performed by causing light from a light source to be incident from the back side.

When a color filter substrate is manufactured by the discharge of ink droplets, a surface modification step is generally performed so that the surface of the target will have a desired liquid repellency or affinity. This is because performing surface modification corresponding to the ink droplets allows the target to be coated more evenly with the discharged ink droplets. Such surface modification can be accomplished by plasma treatment or UV irradiation. Nevertheless, when such surface modification is performed, it requires that the substrate including the target be separately moved to a specific treatment chamber, and this generally hampers efforts to shorten the manufacturing time.

Also, producing a transflective color filter substrate with an inkjet apparatus has been unknown so far.

A reflecting component and a transmitting component are provided for each filter element of a color filter substrate utilized in a transflective liquid crystal display device. The reflecting component is provided in order to reflect external light, while the transmitting component is provided in order to guide light from a light source to the filter element. Because the transmitting component is an opening provided in the reflecting component, there is a step at the boundary between the reflecting component and the transmitting component. When a color filter element is formed over this step by utilizing a discharge apparatus such as an inkjet apparatus, the area around the step is sometimes covered with the color filter material.

In view of the above, it will be apparent to those skilled in the art from this disclosure that there exists a need for an improved color filter substrate that overcomes the above-described problems of the prior art. This invention addresses this need in the art as well as other needs, which will become apparent to those skilled in the art from this disclosure.

SUMMARY OF THE INVENTION

It is an object of the present invention to provide a color filter substrate having a structure that allows a liquid material to be applied properly, a liquid crystal display device having such color filter substrate, and an electronic device having such display device.

A color filter substrate of the present invention includes a first layer, a second layer which is a resist for patterning the first layer, the first and second layer having an opening; a filter layer located at the opening; a reflecting component provided at least partially on a second side of the filter layer such that first light rays that are incident on the filter layer from a first side are reflected to the first side, the first side being an opposite side of the second side; and a transmitting component provided at least partially on the second side of the filter layer, such that second light rays that are incident on the filter layer from the second side are emitted to the first side.

The result of the above is that the resist used to make the openings in the first layer remains as the second layer in the course of manufacturing a transflective color filter substrate. Because the resist exhibits liquid repellency with respect to the liquid color filter material, the color filter material can be applied more easily into the openings of the first layer using an inkjet apparatus or other discharge apparatus.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
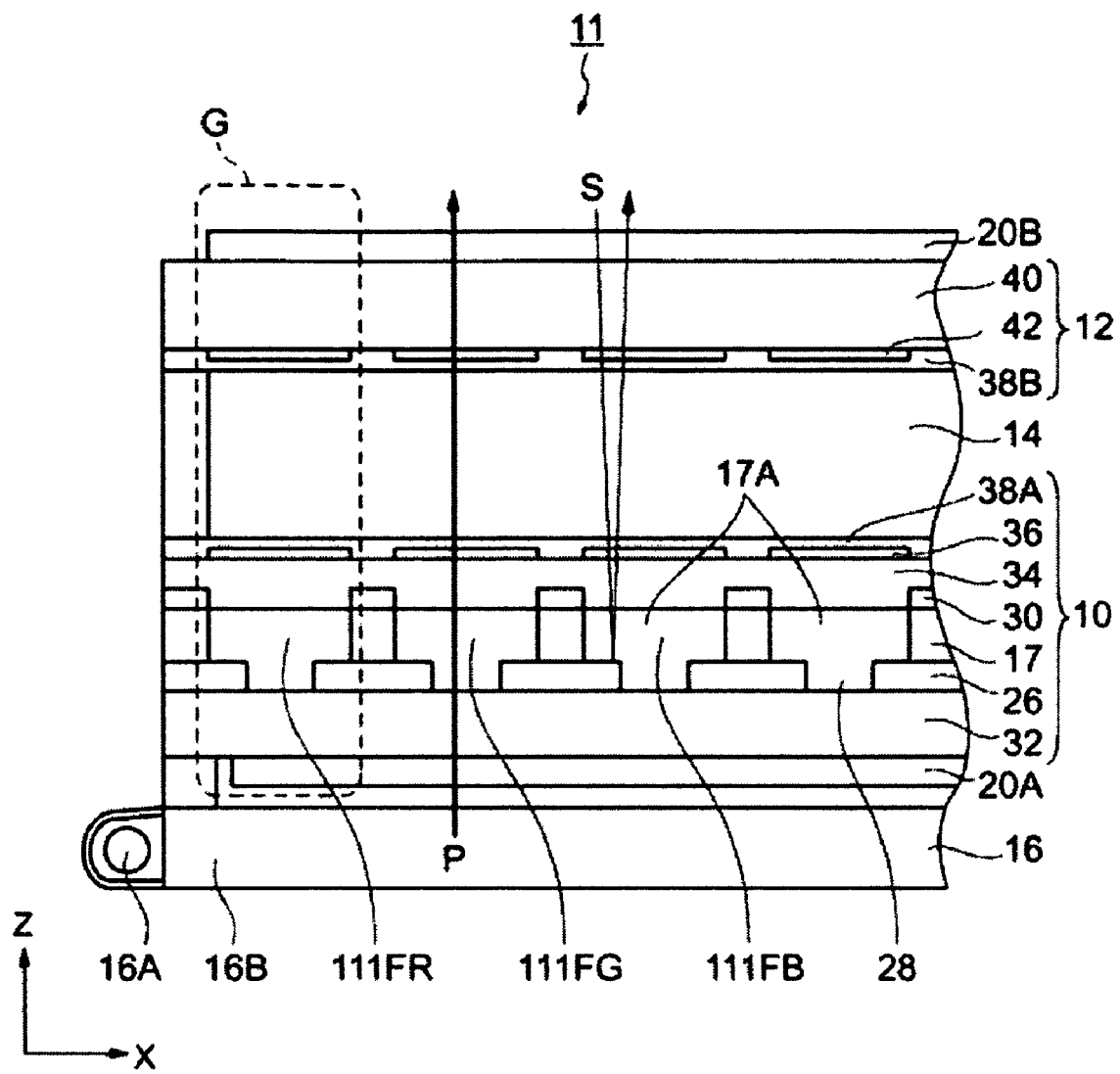
FIG. 1 is a schematic diagram illustrating the liquid crystal display device in accordance with the first embodiment of the present invention.

A color filter substrate of the present invention includes a first layer, a second layer which is a resist for patterning the first layer, the first and second layer having an opening; a filter layer located at the opening; a reflecting component provided at least partially on a second side of the filter layer such that first light rays that are incident on the filter layer from a first side are reflected to the first side, the first side being an opposite side of the second side; and a transmitting component provided at least partially on the second side of the filter layer, such that second light rays that are incident on the filter layer from the second side are emitted to the first side.

With the above constitution, the resist used to make the openings in the first layer remains as the second layer in the course of manufacturing a transflective color filter substrate. Because the resist exhibits liquid repellency with respect to the liquid color filter material, the color filter material can be discharged more easily from the inkjet apparatus or other discharge apparatus into the openings of the first layer.

Preferably, the first layer is a black matrix.

The result of the above is that light transmitted by portions other than the filter layer can be blocked, which affords a color filter substrate with a higher contrast ratio.

Preferably, the surface of the reflecting component has a light scattering surface.

The result of the above is a color filter substrate with no glare from the light reflected by the reflecting component.

Preferably, the above-mentioned color filter substrate further includes a light-transmissive base and a resin layer that is positioned on the first side of the light-transmissive base and has an irregular surface. The light scattering surface of the reflecting component is formed adjacent to the irregular surface of the resin layer.

The result of the above is that a light scattering surface can be easily formed on the surface of the reflecting component.

Preferably, the filter layer is formed by coating the openings with a liquid color filter material, and the liquid repellency of the second layer with respect to the liquid color filter material is greater than the liquid repellency of the first layer with respect to the liquid color filter material.

The result of the above is that when a color filter material is discharged from an inkjet apparatus or other discharge apparatus, the discharged color filter material will flow down into the openings, without flowing over the second layer (which functions as a bank) and outside of the openings in the first layer, so the color filter material can be applied more easily.

Preferably, the first layer exhibits affinity to the liquid color filter material.

The result of the above is that it is easier to form a uniform layer of color filter material within the openings of the black matrix.

Preferably, the resist includes a fluorine-based polymer.

The result of the above is that even if the second layer does not undergo any separate plasma treatment or other such surface modification, the second layer will still exhibit liquid repellency with respect to the color filter material. In other words, the second layer can function as a bank. Accordingly, there is no need for a separate plasma treatment, which means that the manufacturing time can be shortened.

Preferably, the color filter substrate further includes an overcoat layer located on the first side of the reflecting component. The above-mentioned filter layer is located on the first side of the overcoat layer and within the transmitting component.

The result of the above is that the color purity of the reflected light can be relatively lowered, which makes it possible to reduce the difference between the color purity of the reflected light and the color purity of the transmitted light. As a result, the color of a display produced using reflected light will look the same as the color of a display produced using transmitted light.

The present invention can also be embodied as a liquid crystal display device or an electronic device. The term "electronic device" as used herein includes plasma display devices, liquid crystal display devices, electroluminescence display devices, FEDs (Field Emission Displays), SEDs (Surface-conduction Electron-emitter Displays), and so forth. FEDs and SEDs are also called image display devices equipped with electron emitting elements.

The present invention will now be described through reference to the drawings, using as an example a case in which the present invention is applied to a liquid crystal display device. The examples given below do not limit in any way the scope of the inventions set forth in the claims. In other words, it will be apparent to those skilled in the art from this disclosure that the following descriptions of the embodiments of the present invention are provided for illustration only and not for the purpose of limiting the invention as defined by the appended claims and their equivalents. Also, not all of the elements illustrated in the following examples are essential part of the inventions set forth in the claims.

First Embodiment

Liquid Crystal Display Device 11

A liquid crystal display device 11 shown in FIG. 1 is equipped with a TFD (Thin Film Diode; a two-terminal element) as a switching element. The liquid crystal display device 11 includes a polarizer 20A, a polarizer 20B, a color filter substrate 10, an opposing substrate 12, a liquid crystal layer 14, and a light source component 16. The liquid crystal layer 14 is positioned between the color filter substrate 10 and the opposing substrate 12. The side on which the opposing substrate 12 is disposed is a "first side" of the color substrate 10, while side on which the light source component 16 is located is a "second side." The color filter substrate 10 is also positioned between the liquid crystal layer 14 and the light source component 16. The color filter substrate 10, the liquid crystal layer 14, and the opposing substrate 12 are positioned between the polarizer 20A and the polarizer 20B.

The color filter substrate 10 includes a light-transmissive base 32, reflecting components 26, transmitting components 28, a plurality of filter layers 111FR, 111FG, and 111FB, a black matrix 17, a bank 30, a smoothing layer 34, a plurality of light-transmissive electrodes 36, and an orienting film 38A. In this embodiment, the position of the base 32 is between the polarizer 20A and the reflecting components 26 and transmitting components 28. Although there are three types of filter layers 111 FR, 111 FG, and 111 FB in this embodiment, a "color filter substrate" only needs to have at least one filter layer. Therefore, the "color filter substrate" may be defined so that the plurality of electrodes 36 and the orienting film 38A are not included.

The polarizer 20A is positioned so as to cover substantially the entire base 32. In this example, the polarizer 20A and the base 32 are in contact, but the polarizer 20A and base 32 may instead be separated.

The reflecting components 26 and transmitting components 28 are both positioned over the base 32. The reflecting components 26 and transmitting components 28 are both positioned in each of the regions corresponding to the plurality of filter layers 111FR, 111FG, and 111FB. In this example, the reflecting components 26 are formed as an aluminum film formed over the base 32, and the transmitting components 28 are formed as openings in this film.

The black matrix 17 has a plurality of openings 17A. More specifically, the black matrix 17 is a light-blocking component having a shape that defines the plurality of openings 17A. The plurality of openings 17A is arranged so as to define a matrix, and each of the openings 17A corresponds to a pixel region G (discussed below). The black matrix 17 is formed so as to correspond to each of the various reflecting components 26. The black matrix 17 is an example of the "first layer" of the present invention.

Each of the plurality of filter layers 111FR, 111FG, and 111FB corresponds to one of three colors. More specifically, the filter layer 111FR is a filter corresponding to the color red, the filter layer 111FG is a filter corresponding to the color green, and the filter layer 111FB is a filter corresponding to the color blue. The plurality of filter layers 111FR, 111FG, and 111FB is respectively located in the plurality of openings 17A. In other words, each of the filter layers 111FR, 111FG, and 111FB is respectively located on the first side of the reflective component 26 and within the transmitting component 28.

The bank 30 is formed over the black matrix 17. The plan view shape of the bank 30 is the same as the plan view shape of the black matrix 17. As will be described in detail below, the liquid repellency of the bank 30 with respect to the liquid color filter material used to form the filter layers 111FR, 111FG, and 111FB is greater than the liquid repellency of the black matrix 17 with respect to the color filter material. The bank 30 is an example of the "second layer" of the present invention.

The smoothing layer 34 is positioned so as to cover the bank 30 and the plurality of filter layers 111FR, 111FG, and 111FB. More specifically, the smoothing layer 34 covers the steps formed between the bank 30 and the filter layers 111FR, 111FG, and 111FB, so that a substantially flat surface is obtained. The plurality of electrodes 36 is positioned over the smoothing layer 34. Each of the plurality of electrodes 36 is in the form of a stripe extending in a Y axial direction (a direction orthogonal to the paper plane of FIG. 1), so as to be parallel to one another. The orienting film 38A is positioned so as to cover the plurality of electrodes 36 and the smoothing layer 34, and has been subjected to a rubbing treatment in a specific direction.

The opposing substrate 12 includes a light-transmissive substrate 40, a plurality of light-transmissive electrodes 42, and an orienting film 38B. The position of the substrate 40 is between the polarizer 20B and the plurality of electrodes 42. The polarizer 20B is positioned so as to cover substantially the entire substrate 40. In this example, the polarizer 20B and the substrate 40 are in contact, but the polarizer 20B and substrate 40 may instead be separated. Although not depicted in FIG. 1, the opposing substrate 12 is equipped with a plurality of two-terminal elements, each of which is electrically connected to one of the plurality of electrodes 42.

The plurality of electrodes 42 is arranged in a matrix. The orienting film 38B is positioned so as to cover the plurality of electrodes 42 and the substrate 40, and has been subjected to a rubbing treatment in a specific direction. In this example, the rubbing direction of the orienting film 38B and the rubbing direction of the above-mentioned orienting film 38A are set so that the liquid crystals are in TN orientation between the orienting films 38A and 38B.

The liquid crystal layer 14 is positioned between the color filter substrate 10 and the opposing substrate 12. More specifically, the liquid crystal layer 14 is positioned in a space maintained by a plurality of spacers located between the orienting film 38A and the orienting film 38B, and is in contact with the orienting film 38A and the orienting film 38B.

Each of the portions where the electrodes 36 overlap the electrodes 42 corresponds to the pixel region G. A single pixel region G also corresponds to one of the filter layers 111FR, 111FG, and 111FB. For example, the pixel region G encircled in a dotted line in FIG. 1 corresponds to the filter layer 111FR.

The light source component 16 is provided so that the color filter substrate 10 is located between the light source component 16 and the liquid crystal layer 14. The light source component 16 in this example is also called a backlight. The light source component 16 includes a light source 16A that emits white light, and a light guide 16B. The light guide 16B has the function of guiding and scattering the light from the light source 16A, such that the base 32 is uniformly illuminated with the light from the light source 16A.

In this embodiment, the front side of the base 32 is the side on which the filter layers 111FR, 111FG, and 111FB, the black matrix 17, the reflecting components 26, and the transmitting components 28 are formed. The "back side" of the base 32 is the opposite side from the front side. Accordingly, the base 32 could also be said to be located between the filter layers 111FR, 111FG, and 111FB and the light source component 16.

As discussed above, in the color filter substrate 10, the reflecting components 26 and transmitting components 28 are positioned such that one each of the reflecting components 26 and the transmitting components 26 correspond to each of the filter layers 111FR, 111FG, and 111FB. The liquid crystal display device 11 having such color filter substrate 10 functions as follows.

When the backlight (the light source component 16) is used, light rays P from the backlight propagate through the polarizer 20A and the base 32, and then pass through the transmitting components 28. The light rays P that have passed through the transmitting component 28 are incident on the filter layers 111FR, 111FG, and 111FB, and light rays of the corresponding wavelength bands are emitted from the filter layers 111FR, 111FG, and 111FB. The light rays (now colored light) from the filter layers 111FR, 1111FG, and 111FB propagate through the liquid crystal layer 14 and the opposing substrate 12 and are emitted from the polarizer 20B. The intensity of the light rays from the backlight is modulated at the emission face of the polarizer 20B according to the voltage applied between the electrodes 36 and the electrodes 42.

Meanwhile, when external light is used, light rays S (external light, etc.) propagate through the polarizer 20B, the opposing substrate 12, and the liquid crystal layer 14, and are incident on the corresponding filter layers 111FR, 111FG, and 111FB. Of the external light rays that have passed through the filter layers 111FR, 111FG, and 111FB, those that have been reflected by the reflecting components 26 once again propagate through the filter layers 111FR, 111FG, and 111FB and are emitted as light rays of the corresponding colors. The light rays of the various colors again propagate through the liquid crystal layer 14 and the opposing substrate 12, and are emitted from the polarizer 20B. The intensity of the light rays (external light, etc.) is modulated at the emission face of the polarizer 20B according to the voltage applied between the electrodes 36 and the electrodes 42.

The result of the above constitution is first light rays that enter the black matrix 17 from the front side pass through the corresponding filter layers 111FR, 111FG, and 111FB, and are reflected to the front side by the reflecting components 26. Meanwhile, second light rays that enter the black matrix 17 from the back side are emitted to the front side through the transmitting components 28 and the corresponding filter layers 111FR, 111FG, and 111FB. The front side of the black matrix 17 is the side on which the smoothing layer 34 and the liquid crystal layer 14 are located. The back side of the black matrix 17 is the side on which the light source 16 is located.

Thus, the liquid crystal display device 11 is capable of displaying images by utilizing external light, as well as by utilizing light from a backlight. The liquid crystal display device 11 having this function is called a transflective display device.

The filter layers 111FR, 111FG, and 111FB in the color filter substrate 10 are formed by discharging a color filter material into the openings 17A of the black matrix 17 from an inkjet apparatus or other such discharge apparatus.

Figure 8:
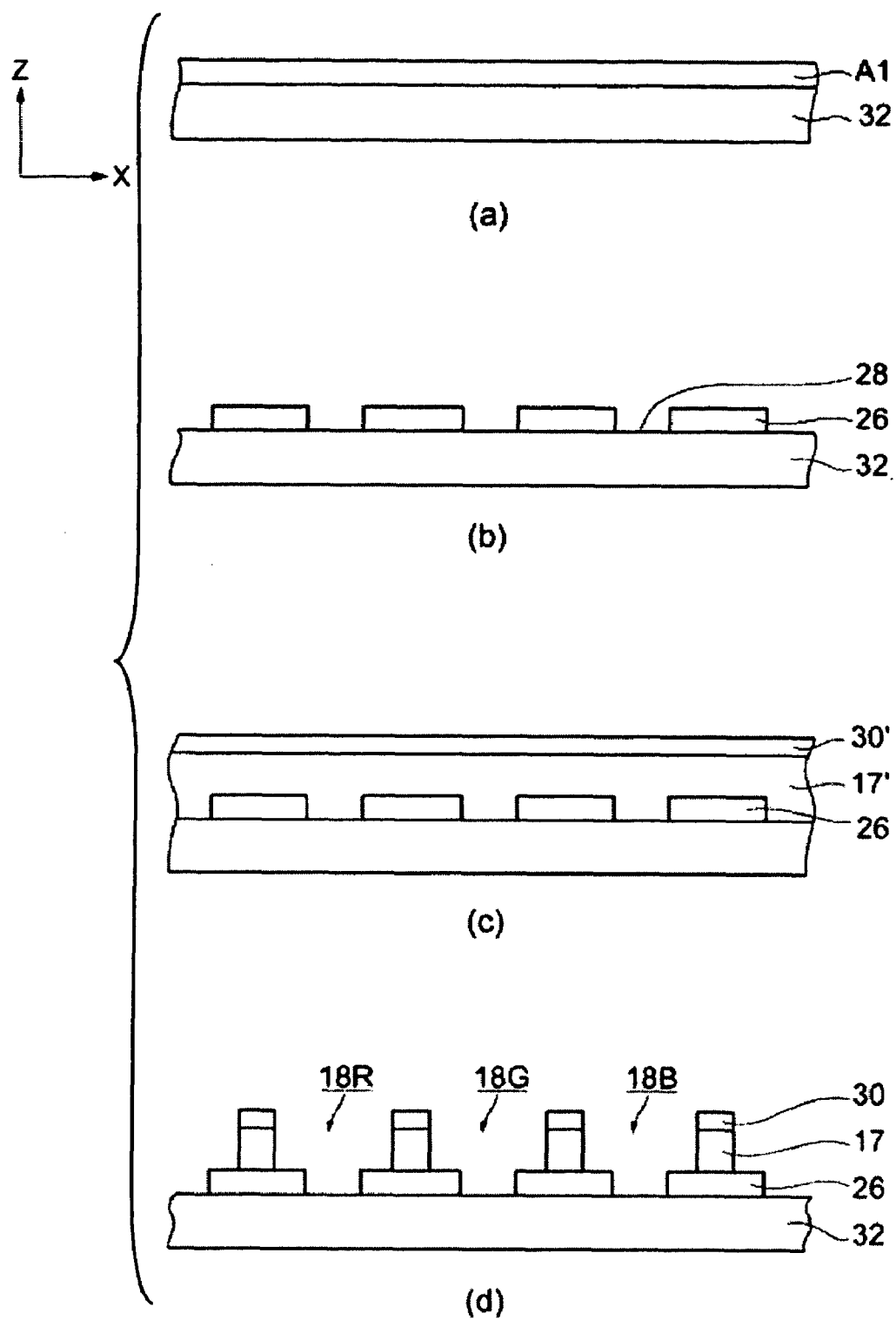
FIG. 8 is a schematic diagram illustrating the basic manufacturing apparatus in accordance with the first embodiment of the present invention.

In this embodiment, the color filter substrate 10 before the filter layers 111FR, 111FG, and 111FB are formed is sometimes referred to as the "substrate 10A." Also in this example, the regions where the filter layers 111FR, 111FG, and 111FB are to be formed are sometimes referred to as "discharge receiving components 18R, 18G, and 18B" (see FIG. 8). With this notation, in the case of this embodiment, the recesses in the substrate 10A defined by the bank 30, the black matrix 17, the reflecting components 26, and the transmitting components 28 correspond to the discharge receiving components 18R, 18G, and 18B. The discharge receiving components 18R, 18G, and 18B are also sometimes referred to as "targets."

Manufacturing Apparatus for Manufacturing Liquid Crystal Display Device 11

The manufacturing apparatus for use in manufacturing the liquid crystal display device 11 will now be described.

Figure 2:
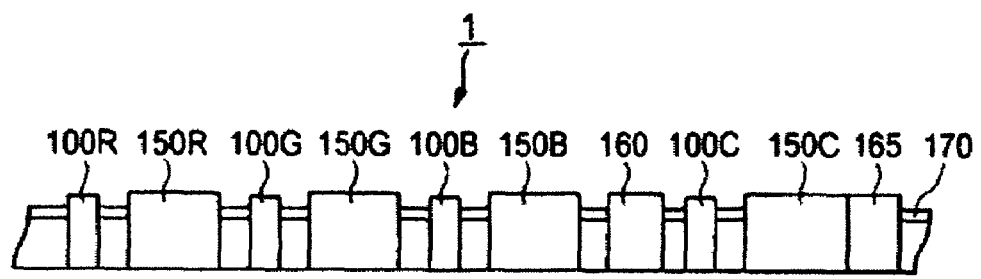
FIG. 2 is a schematic diagram illustrating the manufacturing apparatus in accordance with the first embodiment of the present invention.

The manufacturing apparatus 1 shown in FIG. 2 discharges corresponding color filter materials to the discharge receiving components 18R, 18G, and 18B of the substrate 10A. More specifically, the manufacturing apparatus 1 includes a discharge apparatus 100R for depositing the color filter material 111R onto all of the discharge receiving components 18R, a drying apparatus 150R for drying the color filter material 111R on the discharge receiving components 18R, a discharge apparatus 100G for depositing the color filter material 111G onto all of the discharge receiving components 18G, a drying apparatus 150G for drying the color filter material 111G on the discharge receiving components 18G, a discharge apparatus 100B for depositing the color filter material 111B onto all of the discharge receiving component 18B, a drying apparatus 150B for drying the color filter material 111B on the discharge receiving components 18B, an oven 160 for reheating (post-baking) the color filter materials 111R, 111G, and 111B, a discharge apparatus 100C for providing the smoothing layer 34 over the layers of the post-baked color filter materials 111R, 111G, and 111B, a drying apparatus 150C for drying the smoothing layer 34, and a curing apparatus 165 for reheating and curing the dried smoothing layer 34. The manufacturing apparatus 1 further includes a conveyance apparatus 170 for conveying the substrate 10A to the discharge apparatus 100R, the drying apparatus 150R, the discharge apparatus 100G, the drying apparatus 150G, the discharge apparatus 100B, the drying apparatus 150B, the oven 160, the discharge apparatus 100C, the drying apparatus 150C, and the curing apparatus 165, in that order.

Figure 3:
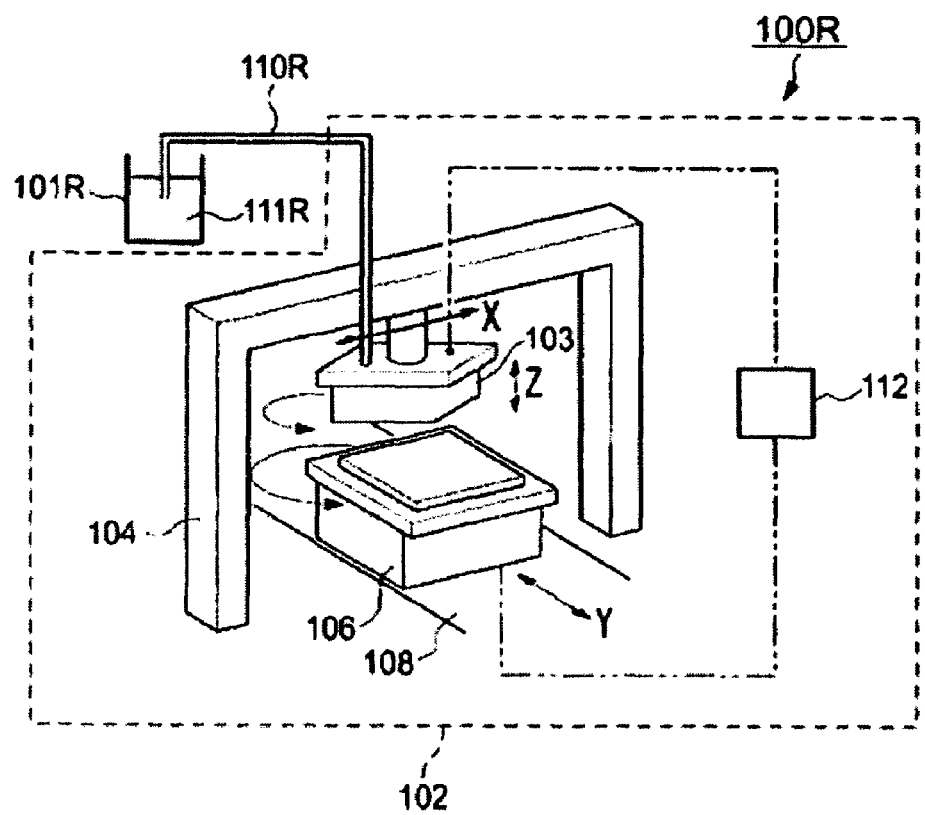
FIG. 3 is a schematic diagram illustrating the discharge apparatus in accordance with the first embodiment of the present invention.

As shown in FIG. 3, the discharge apparatus 100R is equipped with a tank 101R for holding the liquid color filter material 111R, and a discharge scanning component 102 to which the liquid color filter material 111R is supplied from the tank 101R via a tube 110R. The discharge scanning component 102 is equipped with a carriage 103 having a plurality of heads 114 (FIG. 4), each capable of discharging a color filter material, a first position control apparatus 104 for controlling the position of the carriage 103, a stage 106 for supporting the substrate 10A, a second position control apparatus 108 for controlling the position of the stage 106, and a controller 112. The tube 110R links the tank 101R to the plurality of heads 114 on the carriage 103, such that the liquid color filter material 111R is supplied by compressed air from the tank 101R to the heads 114.

The liquid color filter material 111R in this embodiment is an example of the "liquid material" of the present invention. "Liquid material" refers to a material having a viscosity low enough to allow discharge from a nozzle. In this case, it does not matter whether the material is water-based or oil-based, as long as it has a fluidity (viscosity) that allows discharge from a nozzle and also remains in the form of a fluid when a solid substance is admixed.

The first position control apparatus 104 is equipped with a linear motor, and moves the carriage 103 in an X axial direction and in a Z axial direction, which is perpendicular to the X axial direction, according to signals from the controller 112. The second position control apparatus 108 is also equipped with a linear motor, and moves the stage 106 in the Y axial direction, which is perpendicular to the X and Z axial directions, according to signals from the controller 112. The stage 106 has a flat surface that is parallel to both the X axial direction and the Y axial direction, and is designed so that the substrate 10A can be fixedly supported on this flat surface. Since the stage 106 fixedly supports the substrate 10A, the stage 106 can determine the positions of the discharge receiving components 18R, 18G, and 18B. The substrate 10A in this embodiment is an example of a receiving substrate.

The first position control apparatus 104 also has the function of rotating the carriage 103 around an axis that is parallel to the Z axial direction. The Z axial direction is parallel to the vertical direction (that is, the direction of gravitational acceleration). By rotating the carriage 103 around an axis parallel to the Z axial direction with the first position control apparatus 104, the X and Y axes in a coordinate system of the receiving substrate can be made respectively parallel to the X and Y axial directions of the discharge apparatus 100R. In this example, the X and Y axial directions of the discharge apparatus 100R are the directions of relative movement of the carriage 103 with respect to the stage 106. In this embodiments, the first position control apparatus 104 and the second position control apparatus 108 are also referred to as "scanning components."

The carriage 103 and the stage 106 also can perform rotation and parallel movement other than those discussed above. In this embodiment, though, movements in other directions are not described in order to simplify the discussion.

The controller 112 is designed so that discharge data that indicate relative positions where the color filter material 111R is to be discharged are received from an external information processing unit.

Figure 4:
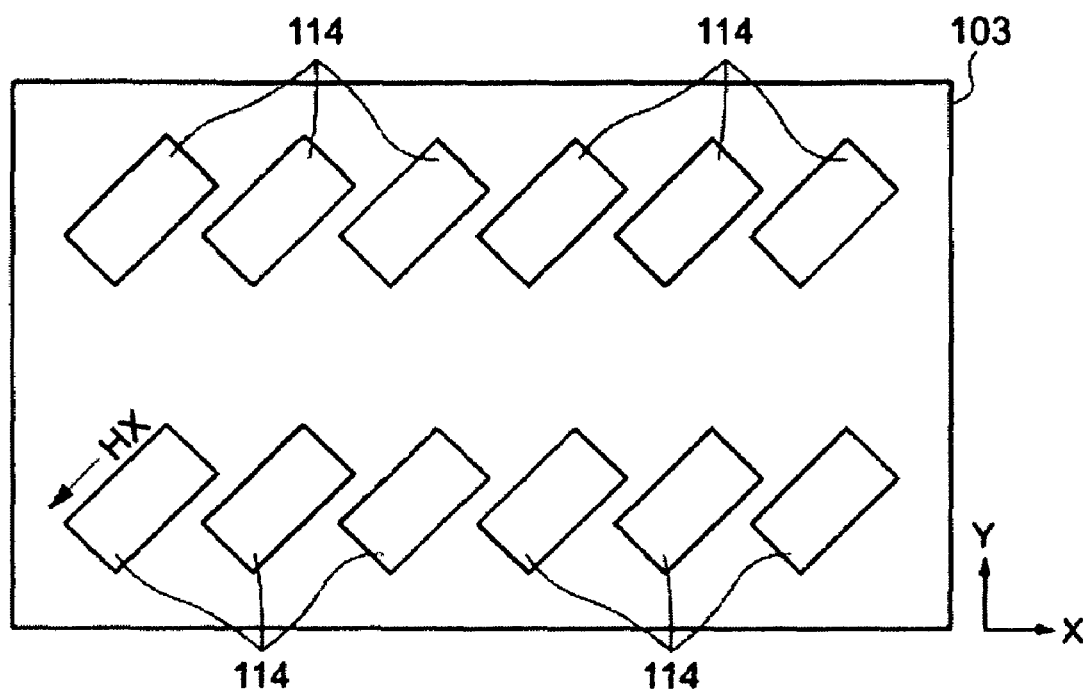
FIG. 4 is a schematic diagram illustrating the carriage in accordance with the first embodiment of the present invention.

As shown in FIG. 4, the carriage 103 supports the plurality of heads 114, all of which have the same construction. FIG. 4 here is a view of the carriage 103 as seen from the stage 106 side. The direction orthogonal to the paper plane of the drawing is therefore the Z axial direction. In this embodiment, two rows of six heads 114 are arranged on the carriage 103. Each of the heads 114 is provided on the carriage 103 such that the lengthwise direction of the head 114 forms an angle AN with respect to the X axial direction.

Figure 5:
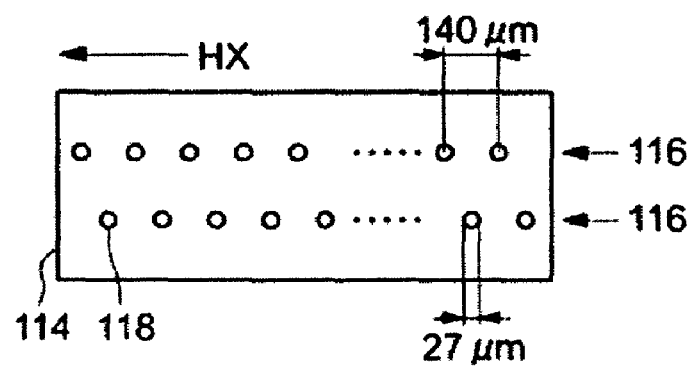
FIG. 5 is a schematic diagram illustrating the head in accordance with the first embodiment of the present invention.

As shown in FIG. 5, each of the heads 114 used to discharge the color filter material 111R has two nozzle columns 116, each of which extends in the lengthwise direction of the head 114. One nozzle column 116 includes 180 nozzles 118 aligned in a row. There is a spacing of approximately 140 μm between the 180 nozzles 118 in the direction in which the nozzles 118 are aligned (hereinafter referred to as the nozzle row direction HX). In FIG. 5, the two nozzle columns 116 on a single head 114 are offset by a half-pitch (approximately 70 μm) with respect to each other. The nozzles 118 are about 27 μm in diameter. Since, as mentioned above, the lengthwise direction of the heads 114 forms an angle AN with respect to the X axial direction, the nozzle row direction HX also forms an angle AN with respect to the X axial direction. The ends of the plurality of nozzles 118 are located in a plane parallel to the above-mentioned X axial direction and Y axial direction. The shape of the nozzles 118 is adjusted so that the heads 114 will be able to discharge the material in a direction substantially parallel to the Z axis.

The angle AN may be appropriately adjusted so that at least any two of the nozzles 118 simultaneously correspond to some of the plurality of discharge receiving components 18R aligned in the X axial direction. This allows two rows of the nozzles 118 to perform scan coating simultaneously within a single scan period. In this case, the two nozzles 118 need not be adjacent to each other.

Figure 6:
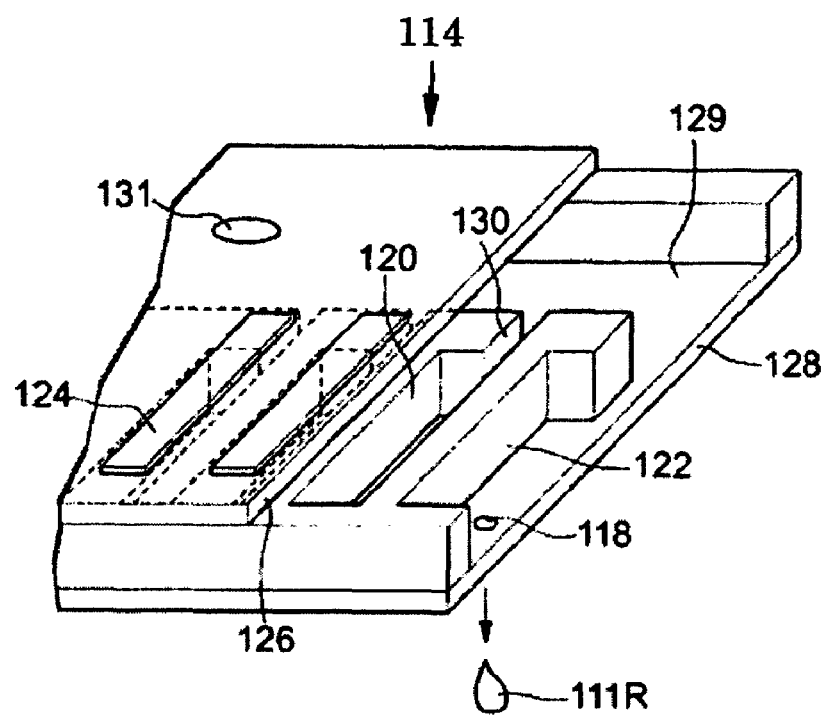
FIGS. 6a and 6b are schematic diagrams illustrating the discharge components of the head shown in FIG. 5 in accordance with the first embodiment of the present invention.
Figure 6:
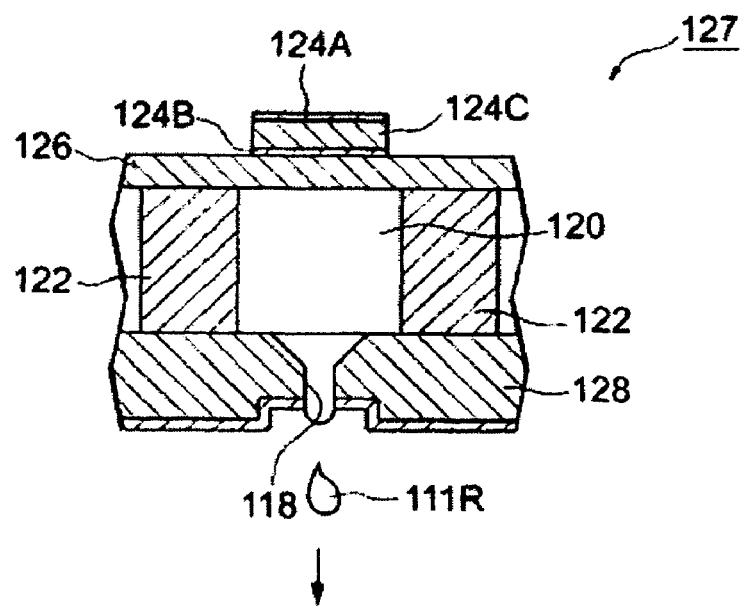

As shown in FIGS. 6a and 6b, each of the heads 114 is an inkjet head. More specifically, each of the heads 114 is equipped with a diaphragm 126 and a nozzle plate 128. A reservoir 129, which is always filled with the liquid color filter material 111R that is supplied from the tank 101R through a hole 131, is located in between the diaphragm 126 and the nozzle plate 128. A plurality of partitions 122 is also located between the diaphragm 126 and the nozzle plate 128. The portion surrounded by the diaphragm 126, the nozzle plate 128, and a pair of partitions 122 constitutes a cavity 120. Since each cavity 120 is provided corresponding to each nozzle 118, the number of cavities 120 is the same as the number of nozzles 118. The color filter material 111R is supplied from the reservoir 129 to the cavity 120 through a supply port 130, which is located between a pair of partitions 122.

Vibrators 124 corresponding to the cavities 120 are located on the diaphragm 126. Each vibrator 124 includes a piezo element 124C and a pair of electrodes 124A and 124B that sandwich the piezo element 124C. When drive voltage is applied to this pair of electrodes 124A and 124B, the liquid color filter material 111R is discharged from the corresponding nozzle 118.

The controller 112 (FIG. 3) is designed so as to send mutually independent signals to the plurality of vibrators 124. The volume of the color filter material 111R to be discharged from the nozzles 118 is controlled for each of the nozzles 118 according to the signals from the controller 112. Furthermore, the volume of the color filter material 111R discharged from the nozzles 118 can be varied between 0 and 42 pL (picoliters). This makes it possible to configure which nozzles 118 should perform a discharge operation and which nozzles 118 should not perform a discharge operation during a coating scan.

In this embodiment, the portion having one nozzle 118, the cavity 120 corresponding to that nozzle 118, and the vibrator 124 corresponding to that cavity 120 is sometimes referred to as a discharge component 127. With this notation, one head 114 has as many discharge components 127 as the nozzles 118. Alternatively, a discharge component 127 may have electro-thermal conversion elements instead of piezo elements. In other words, a discharge component 127 may be constituted to discharge the material by utilizing the thermal expansion of the material by electro-thermal conversion elements.

As discussed above, the carriage 103 is moved in the X and Z axial directions by the first position control apparatus 104 (FIG. 3). Meanwhile, the stage 106 (FIG. 3) is moved in the Y axial direction by the second position control apparatus 108 (FIG. 3). As a result, the relative positions of the heads 114 with respect to the stage 106 are varied by the first position control apparatus 104 and the second position control apparatus 108. More specifically, as a result of the operation of these apparatuses, a plurality of heads 114, a plurality of nozzle columns 116, or a plurality of nozzles 118 are relatively moved, that is, relatively scanned, in the X and Y axial directions with respect to the stage 106, while a predetermined distance is maintained in the Z axial direction with respect to the discharge receiving components 18R positioned on the stage 106. Even more specifically, the heads 114 scan relatively in the X and Y axial directions with respect to the stage 106, and material is discharged from a plurality of nozzles 118. With the present embodiment, the nozzles 118 may be scanned with respect to the discharge receiving components 18R, 18G, and 18B so that the material is discharged from the nozzles 118 with respect to the discharge receiving components 18R. "Relative scanning" includes scanning one of the discharge side and the side on which the discharged material lands (such as the discharge receiving components 18R) with respect to the other. A combination of relative scanning and discharge of material will sometimes be referred to as a "coating scan."

Figure 7:
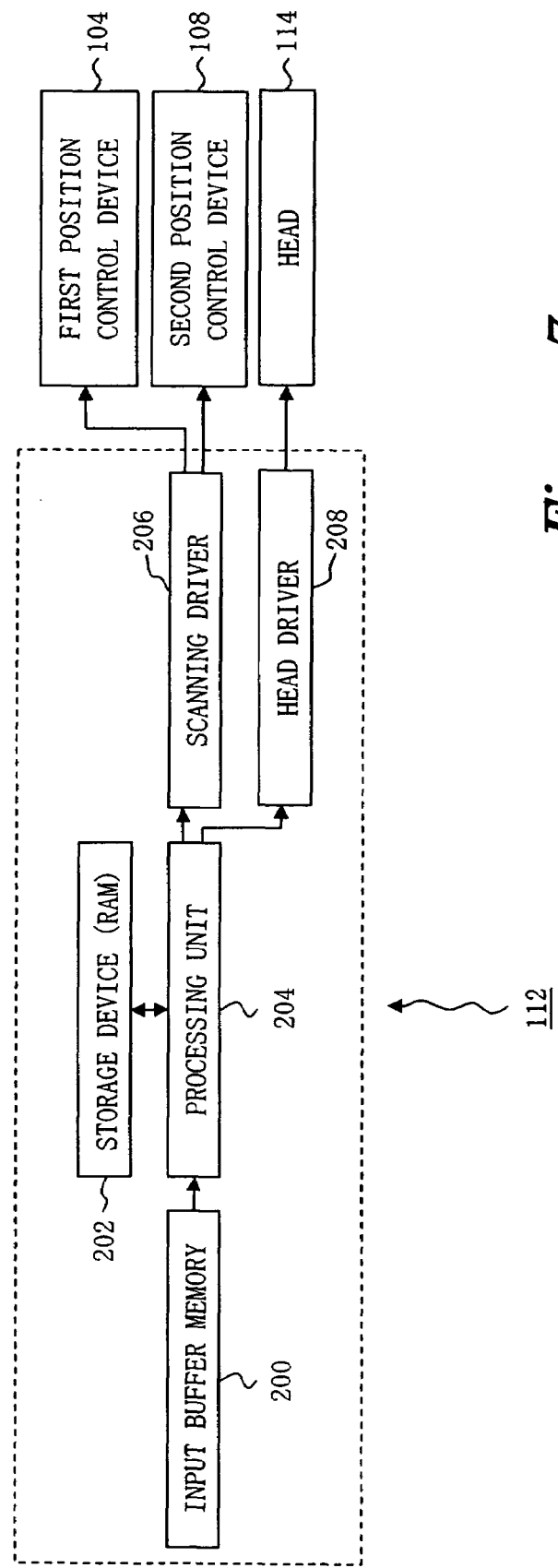
FIG. 7 is a functional block diagram of the controller in a discharge apparatus in accordance with the first embodiment of the present invention.

The structure of the controller 112 will now be described. As shown in FIG. 7, the controller 112 includes an input buffer memory 200, a storage device 202, a processor 204, a scan driver 206, and a head driver 208. The input buffer memory 200 and the processor 204 are connected so as to be able to communicate with each other. The processor 204 and the storage device 202 are also connected so as to be able to communicate with each other. The processor 204 and the scan driver 206 are also connected so as to be able to communicate with each other. The scan driver 206 is connected so as to be able to communicate with the first position control apparatus 104 and the second position control apparatus 108. Similarly, the head driver 208 is connected so as to be able to communicate with the plurality of heads 114.

The input buffer memory 200 receives discharge data for performing the discharge of the color filter material 111R from an external information processor. The discharge data includes data indicating relative positions of all the discharge receiving components 18R on the substrate 10A, data indicating positions where the material is to be discharged or where it is to land, data indicating the number of relative scans required until all of the discharge receiving components 18R are coated with the color filter material 111R to the desired thickness, and data specifying the nozzles 118 that will discharge material and the nozzles 118 for which material discharge is to be suspended. The input buffer memory 200 supplies the discharge data to the processor 204, and the processor 204 stores the discharge data in the storage device 202. The storage device 202 in FIG. 7 is a RAM.

The processor 204 gives the scan driver 206 data indicating the relative positions of the nozzle columns 116 with respect to the discharge receiving components 18R on the basis of the discharge data in the storage device 202. The scan driver 206 gives the first position control apparatus 104 and the second position control apparatus 108 drive signals corresponding to this data. As a result, the nozzle columns 116 are scanned with respect to the discharge receiving components 18R. Meanwhile, the processor 204 gives the head driver 208 data indicating the discharge timing from the corresponding nozzles 118 on the basis of the discharge data stored in the storage device 202. The head driver 208 gives the heads 114 the drive signals necessary for the discharge of the color filter material 111R on the basis of this data. As a result, the liquid color filter material 111R is discharged from the corresponding nozzles 118 in the nozzle columns 116.

The controller 112 may be a computer including a CPU, a ROM, a RAM, and a bus. In this case, the above-mentioned functions of the controller 112 are handled by a software program executed by the computer. Naturally, the controller 112 may also be formed as a dedicated circuit (hardware).

With the above constitution, the discharge apparatus 100R performs a coating scan with the color filter material 111R according to the discharge data provided to the controller 112.

The above description is regarding the constitution of the discharge apparatus 100R. The constitution of the discharge apparatus 100G and the constitution of the discharge apparatus 100B are basically the same as the constitution of the discharge apparatus 100R. However, the constitution of the discharge apparatus 100G differs from the constitution of the discharge apparatus 100R in that the discharge apparatus 100G is equipped with a tank for the color filter material 111G instead of the tank 101R used with the discharge apparatus 100R. Similarly, the constitution of the discharge apparatus 100B differs from the constitution of the discharge apparatus 100R in that the discharge apparatus 100B is equipped with a tank for the color filter material 111B instead of the tank 101R. Further, the constitution of the discharge apparatus 100C differs from the constitution of the discharge apparatus 100R in that the discharge apparatus 100C is equipped with a tank for a protective film material.

Method of Manufacturing Liquid Crystal Display Device 11

The method for manufacturing the liquid crystal display device 11 will now be described referring to FIG. 8.

First, the reflecting component 26 and the transmitting component 28 are formed on a translucent member. More specifically, as shown in FIG. 8($a$), an aluminum (Al) film is formed by sputtering or another such method so as to cover substantially the entire surface of the light-transmissive base 32 (such as a glass base member). The base 32 here corresponds to the "light-transmissive member" in the present invention. Then, as shown in FIG. 8($b$), the above-mentioned aluminum film is patterned so as to form the reflecting component 26 and the transmitting component 28 in each pixel region G. More specifically, the aluminum film is patterned so that the shape of the transmitting components 28 is substantially rectangular. The aluminum film remaining on the base 32 after patterning becomes the reflecting components 26, while the portions from which the aluminum film has been removed become the transmitting components 28. The reflecting components 26 and the transmitting components 28 are formed in this manner on the translucent member.

In this example, the reflecting components 26 are provided directly on the base 32, but a protective film or another such layer may be provided between the base 32 and the reflecting components 26. In such case, the term "base 32" encompasses this protective film or other such layer.

Next, a layer of a first material is formed covering the reflecting component 26 and the transmitting component 28. More specifically, as shown in FIG. 8($c$), a heat-curing acrylic resin (resin black) in which a black pigment has been dispersed is applied in a thickness of about 3 μm so as to cover the reflecting component 26 and the base 32. The result is a resin black layer 17'. The resin black layer 17' here corresponds to the "layer of a first material" in the present invention.

A layer of a second material is then formed by coating the first material layer with a resist. More specifically, as shown in FIG. 8($c$), a negative, acrylic-based, chemically amplified, photosensitive resist into which a fluoropolymer has been blended is applied so as to cover substantially the entire surface of the resin black layer 17'. As a result, a resist layer 30' is obtained over the resin black layer 17'. The resist layer 30' here is an example of the "layer of a second material" in the present invention.

The resist layer 30' and the resin black layer 17' are then patterned. More specifically, the resist layer 30' is irradiated with light hv through a photomask having a light-blocking component in the areas corresponding to the pixel regions G. Etching is then performed with a predetermined etching fluid to remove a plurality of portions not irradiated with the light hv, namely, the resin black layer 17' and the resist layer 30' in the plurality of portions corresponding to the plurality of pixel regions G. As a result, as shown in FIG. 8(*d*), the black matrix 17 and the bank 30, which are shaped so as to surround the filter layers that will be formed subsequently, are simultaneously obtained on the base 32. In other words, the openings 17A corresponding to the reflecting component 26 and the transmitting component 28 are obtained.

As discussed above, the regions defined or surrounded by the black matrix 17, the bank 30, the reflecting component 26, and the transmitting component 28 are the discharge receiving components 18R, 18G, and 18B. The bank 30 is light-transmissive. Also, as mentioned above, the black matrix 17 is an example of the "first layer" in the present invention, while the bank 30 is an example of the "second layer."

Thus, regions defined by the black matrix 17 and the bank 30 (that is, the discharge receiving components 18R, 18G, and 18B) are provided on the substrate 10A by forming the black matrix 17 and the bank 30 that is located on the black matrix 17.

The method by which the discharge apparatus 100R discharges the color filter material 111R onto the discharge receiving components 18R will now be described.

Figure 9:
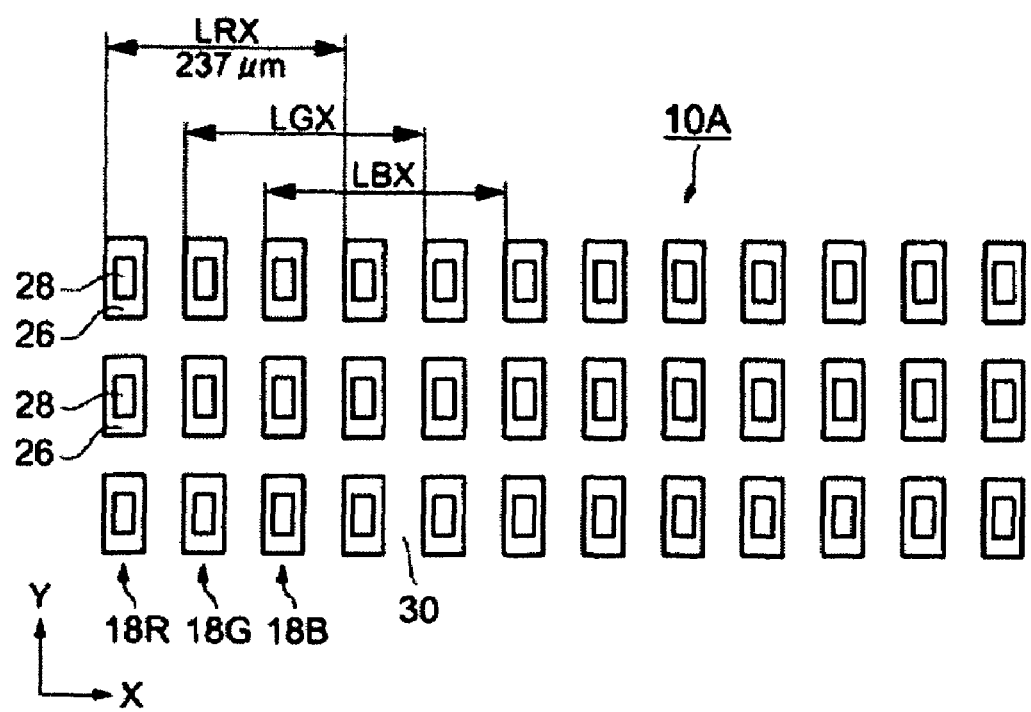
FIG. 9 is a schematic diagram illustrating the discharge apparatus in accordance with the first embodiment of the present invention.

With the substrate 10A shown in FIG. 9, the row and column directions of the matrix formed by the plurality of discharge receiving components 18R, 18G, and 18B are parallel to the X and Y axial directions, respectively. Further, the discharge receiving components 18R, the discharge receiving components 18G, and the discharge receiving components 18B are arranged periodically in that order in the X axial direction. Meanwhile, the discharge receiving components 18R are aligned in a single line at a specific spacing in the Y axial direction, the discharge receiving components 18G are aligned in a single line at a specific spacing in the Y axial direction, and the discharge receiving components 18B are aligned in a single line at a specific spacing in the Y axial direction.

As shown in FIG. 9, the spacing LRX between two adjacent lines of the discharge receiving components 18R in the X axial direction is about 237 μm. This spacing LRX is the same as the spacing LGX between two adjacent lines of the discharge receiving components 18G in the X axial direction, and is also the same as the spacing LBX between two adjacent lines of the discharge receiving components 18B in the X axial direction. Also, the lengths of the discharge receiving components 18R, 18G, and 18B in the X and Y axial directions are approximately 50 μm and approximately 120 μm, respectively.

In this example, with the discharge receiving components 18R, the transmitting components 28 are recesses in the reflecting components 26, and steps are therefore formed in the discharge receiving components 18R (FIG. 8*d*). More specifically, steps are located at the boundaries between the reflecting components 26 and the transmitting components 28. This is because the transmitting components 28 are the openings in the reflecting components 26, and are formed by removing parts of the reflecting components 26. Therefore, the size of the step is equivalent to the thickness of the reflecting component 26. With the discharge receiving components 18G and 18B, the transmitting components 28 are similarly recesses in the reflecting components 26.

First, the conveyance apparatus 170 positions the substrate 10A on the stage 106 of the discharge apparatus 100R. More specifically, the substrate 10A is fixedly supported on the stage 106 so that the row and column directions of the matrix formed by the plurality of discharge receiving components 18R, 18G, and 18B are parallel to the X and Y axial directions, respectively.

Figure 10:
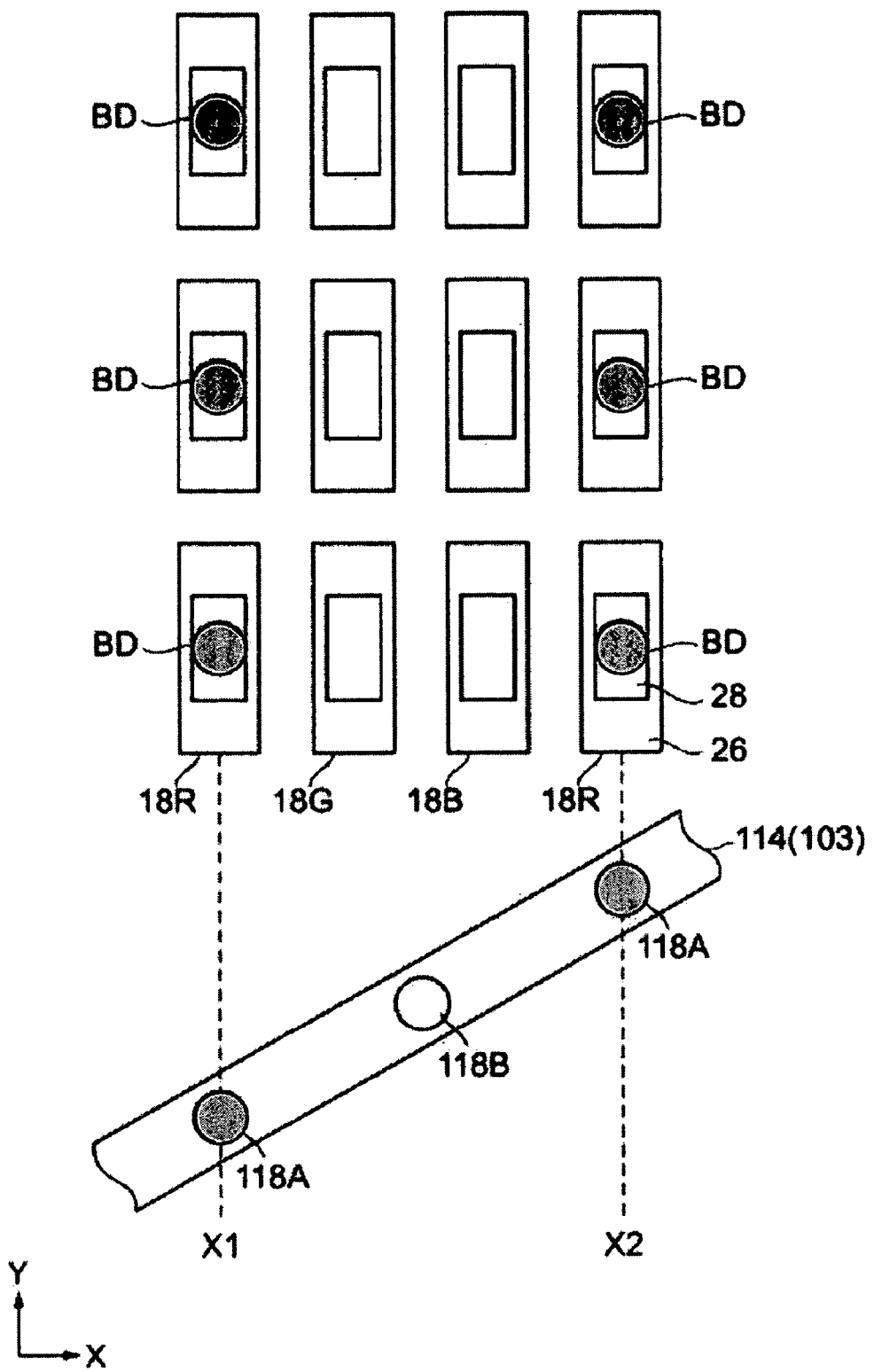
FIG. 10 is a schematic diagram illustrating the discharge method in accordance with the first embodiment of the present invention.

Before the first scanning period begins, the discharge apparatus 100R matches up the X coordinates of the nozzles 118 with the X coordinates of the discharge receiving components 18R. More specifically, the X coordinates of the leftmost one of the nozzles 118 shown in FIG. 10 is made to coincide with the leftmost column of X coordinates X 1 of the columns of discharge receiving components 18R shown in FIG. 10. At the same time, the X coordinates of the rightmost one of the nozzles 118 shown in FIG. 10 are made to coincide with the rightmost column of X coordinates X 2 of the columns of discharge receiving components 18R shown in FIG. 10. A nozzle 118 corresponding to the discharge receiving components 18R will hereinafter sometimes be referred to as the first nozzle 118A. A nozzle not corresponding to the discharge receiving components 18R will sometimes be referred to as the second nozzle 118B.

Figure 13:
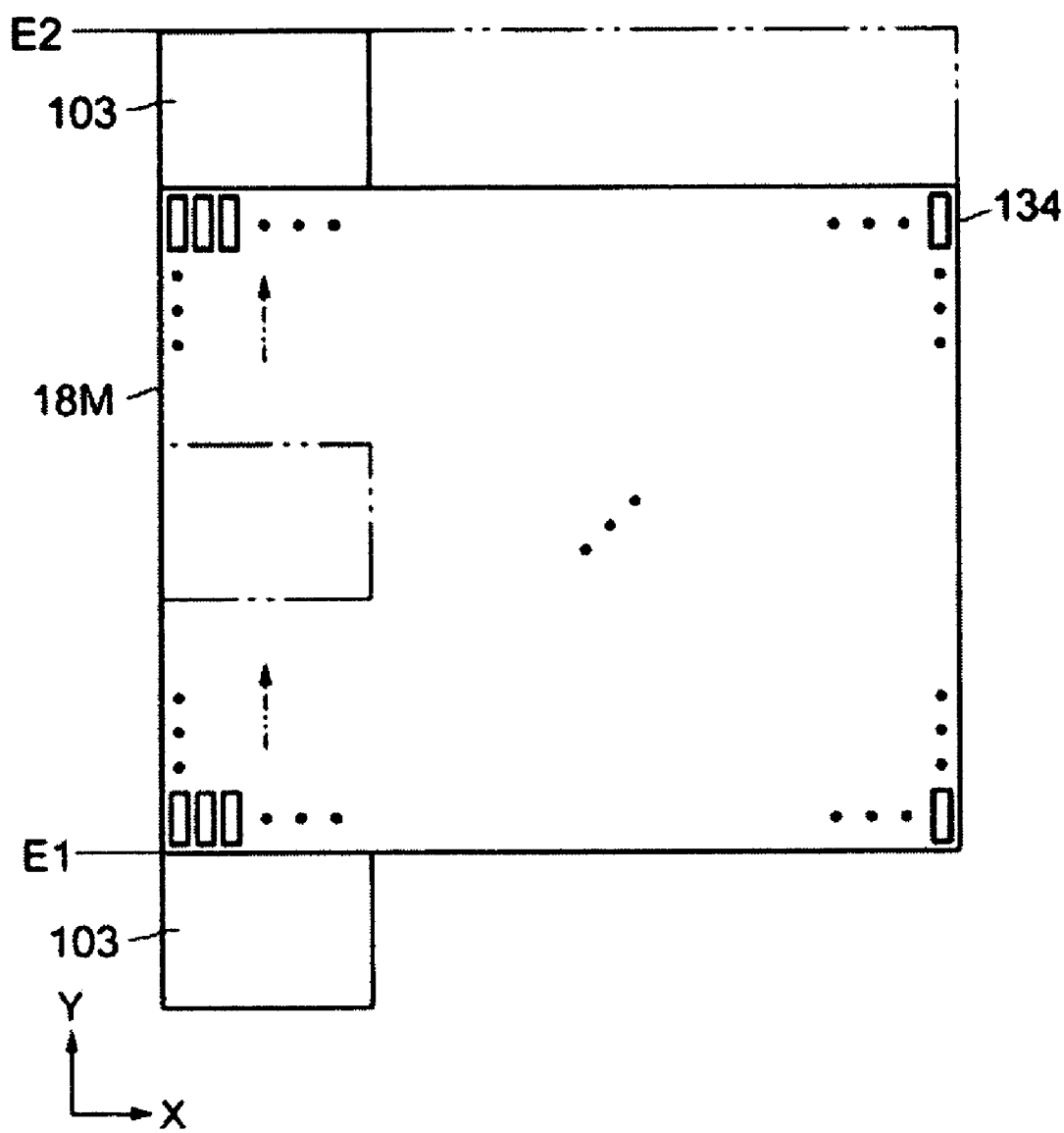
FIG. 13 is a schematic diagram illustrating the scanning range in accordance with the first embodiment of the present invention.

The term "scanning period" as used in this embodiment means, as shown in FIG. 13, the period in which relative movement of one side of the carriage 103 in the Y axial direction from one end E1 (or the other end E2) of a scanning range 134 to the other end E2 (or E1) is performed one time in order to apply material to all of the plurality of discharge receiving components 18R aligned in the Y axial direction. The term "scanning range 134" as used in this embodiment means the range over which one side of the carriage 103 moves relatively by the time all of the discharge receiving components 18R included in a matrix 18M have been coated with the color filter material 111R. In some cases, however, the term "scanning range" may mean the range of relative movement of a single nozzle 118, or may mean the range of relative movement of a single nozzle column 116, or may mean the range of relative movement of a single head 114. The matrix 18M is made up of the discharge receiving components 18R, 18G, and 18B.

The "relative movement" of the carriage 103, the heads 114, or the nozzles 118 refers to a change in the relative positions of these parts with respect to the discharge receiving components 18R. Therefore, a case in which the carriage 103, the heads 114, or the nozzles 118 come to an absolute standstill and only the discharge receiving components 18R are moved by the stage 106 will also be referred to as relative movement of the carriage 103, the heads 114, or the nozzles 118.

As shown in FIG. 10, when the first scanning period commences, the carriage 103 begins relative movement in the forward direction (upward in the drawing) of the Y axial direction from one end E1 of the scanning range 134. If the first nozzle 118A enters the region corresponding to the discharge receiving components 18R during the first scanning period, then the color filter material 111R is discharged from the first nozzle 118A into the discharge receiving components 18R. More specifically, once the nozzle 118A enters the region corresponding to the transmitting component 28 in the discharge receiving components 18R, the nozzle 118A discharges the color filter material 111R. In the example depicted in FIG. 10, during the first scanning period the color filter material 111R is discharged one time for each of the discharge receiving components 18R. In FIG. 10, the circles indicate positions where the nozzle 118A discharges the color filter material 111R, or landing positions BD.

Figure 11:
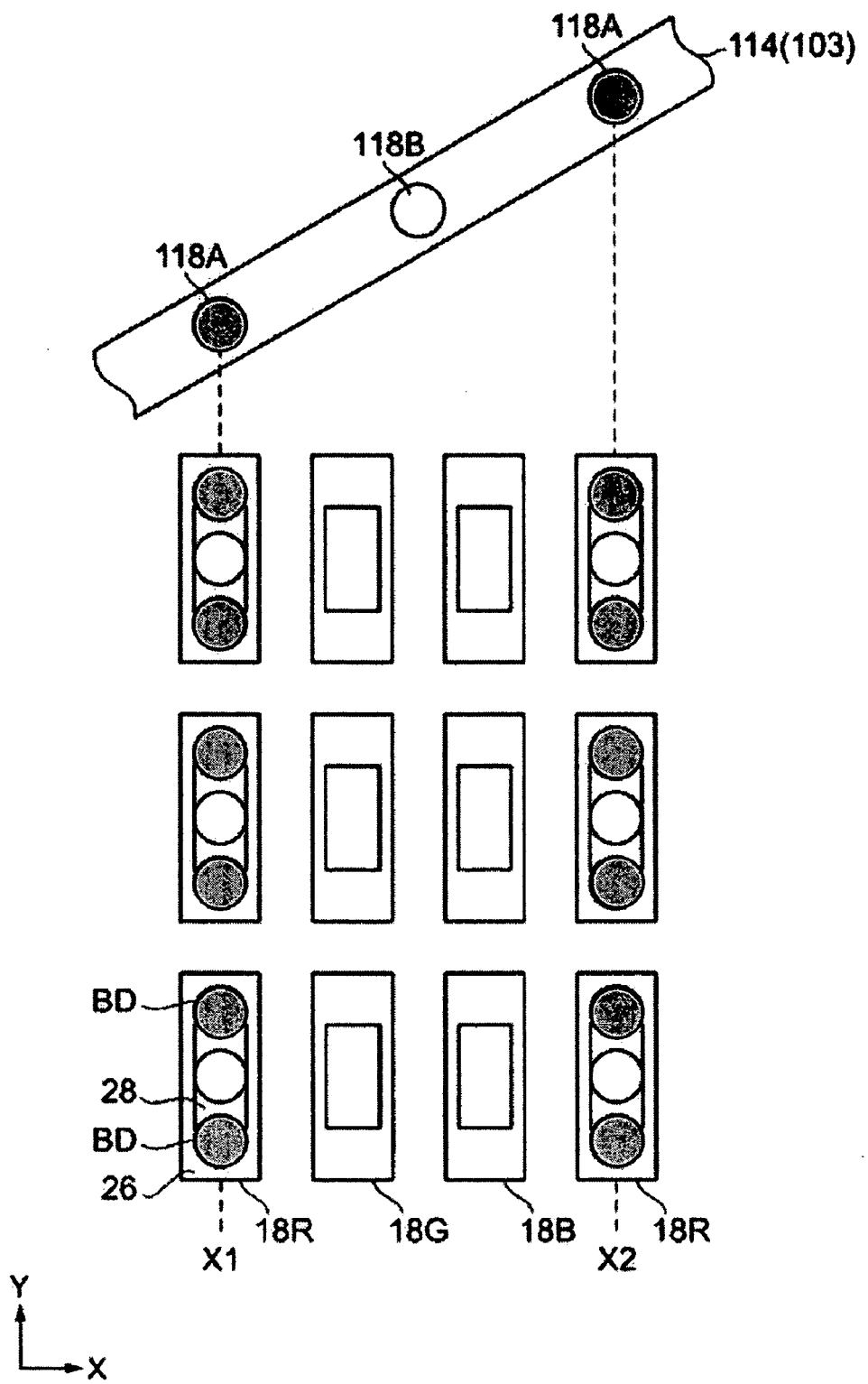
FIG. 11 is a schematic diagram illustrating the discharge method in accordance with the first embodiment of the present invention.

As shown in FIG. 11, when the second scanning period commences right after the first scanning period, the carriage 103 begins relative movement in the negative direction of the Y axial direction (downward direction in the Figure) from the end E2 of the scanning range 134. If the first nozzle 118A enters the region corresponding to the discharge receiving components 18R during the second scanning period, then the color filter material 111R is discharged from the first nozzle 118A into the corresponding discharge receiving components 18R. More specifically, once the nozzle 118A enters the region corresponding to the reflecting component 26, the nozzle 118A discharges the color filter material 111R. In the example depicted in FIG. 11, during the second scanning period the color filter material 111R is discharged twice for each of the discharge receiving components 18R. In FIG. 11, the black circles indicate positions where the nozzle 118A discharges the color filter material 111R, or landing positions BD. The white circles in FIG. 11 indicate the positions where the color filter material 111R is discharged during the first scanning period.

After this, the discharge apparatus 100R moves the X coordinates of the carriage 103 in stages, and discharges the color filter material 111R as discussed above onto all of the discharge receiving components 18R on the substrate 10A.

By discharging the color filter material 111R in this manner, the color filter material 111R is first discharged onto the recessed transmitting component, and then onto the reflecting component. Accordingly, not only the reflecting component and the openings, but also the area around the step located at the boundary between the reflecting component and the openings are covered with the liquid material. As a result, a color filter substrate for a transflective display device can be easily manufactured even when an inkjet apparatus or other such discharge apparatus is used.

The above-mentioned discharge method will be described through reference to FIG. 12, focusing on one of the discharge receiving components 18R.

Figure 12:
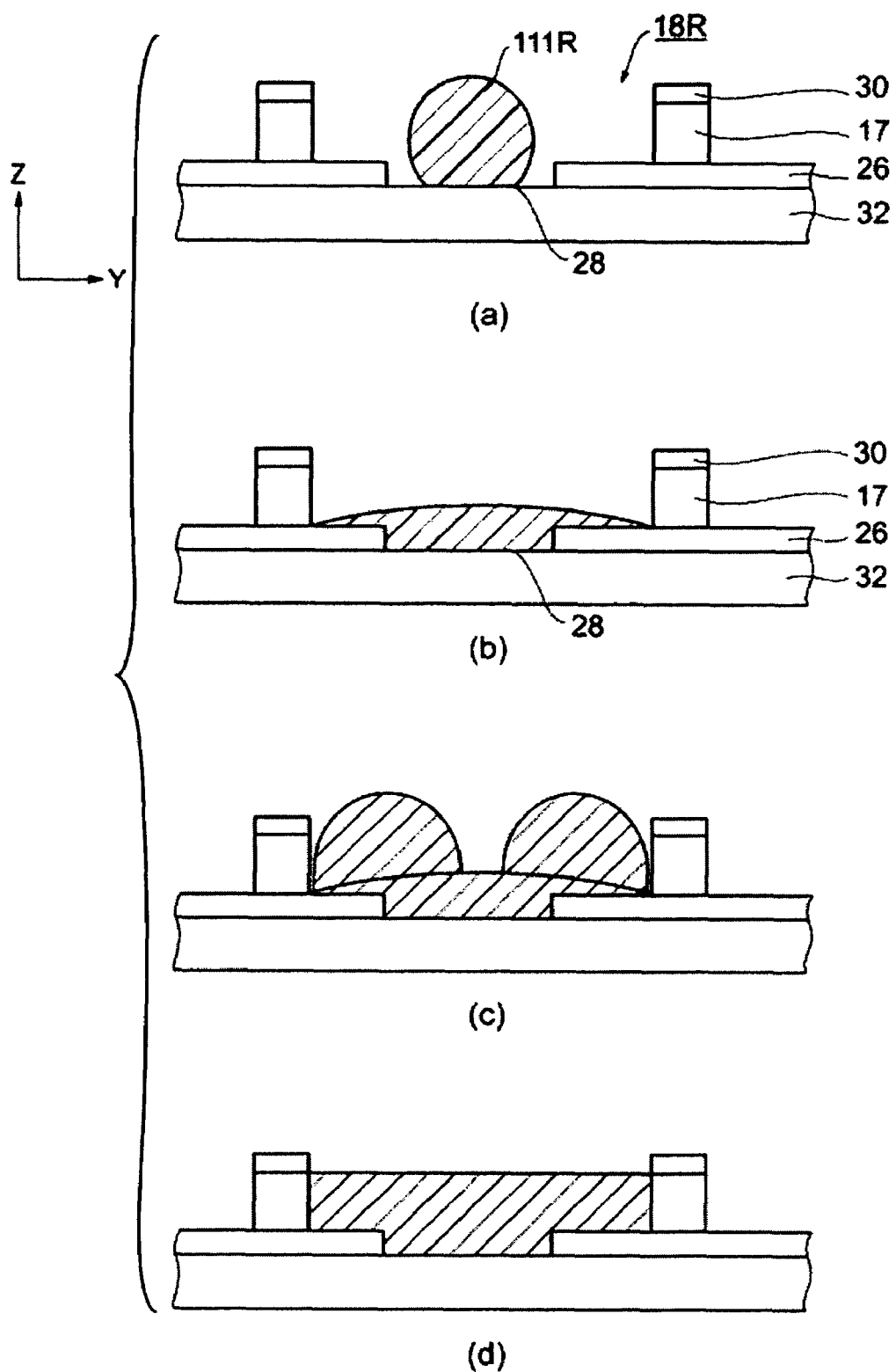
FIG. 12 is a schematic diagram illustrating the discharge method in accordance with the first embodiment of the present invention.

FIG. 12 is a Y-Z cross section of a discharge receiving component 18R. That is, the left and right direction as seen in FIG. 12 is the lengthwise direction of the discharge receiving component 18R. As shown in FIG. 12a, during the first scanning period (within the first scanning period), the color filter material 111R is discharged toward the transmitting component 28. As shown in FIG. 12b, when the color filter material 111R lands on the transmitting component 28, the color filter material 111R spreads out to cover not just the transmitting component 28, but also the step located at the boundary between the transmitting component 28 and the reflecting component 26. As shown in FIG. 12(c), during the second scanning period (within the second scanning period), the color filter material 111R is discharged on the portion substantially corresponding to the reflecting component 26. In this case, there is no problem even if some of the droplets of the color filter material 111R land overlapping the transmitting component 28. After this, as shown in FIG. 12(d), the solvent is vaporized from the color filter material 111R discharged during the first and second scanning periods, which forms a layer of color filter material 111R within the discharge receiving component 18R. Further drying of the layer in FIG. 12(d) results in the filter layer 111FR.

The above is how the discharge apparatus 100R discharges the color filter material 111R onto the discharge receiving components 18R. A series of methods for manufacturing the color filter substrate 10 with the manufacturing apparatus 1 will now be described.

Figure 14:
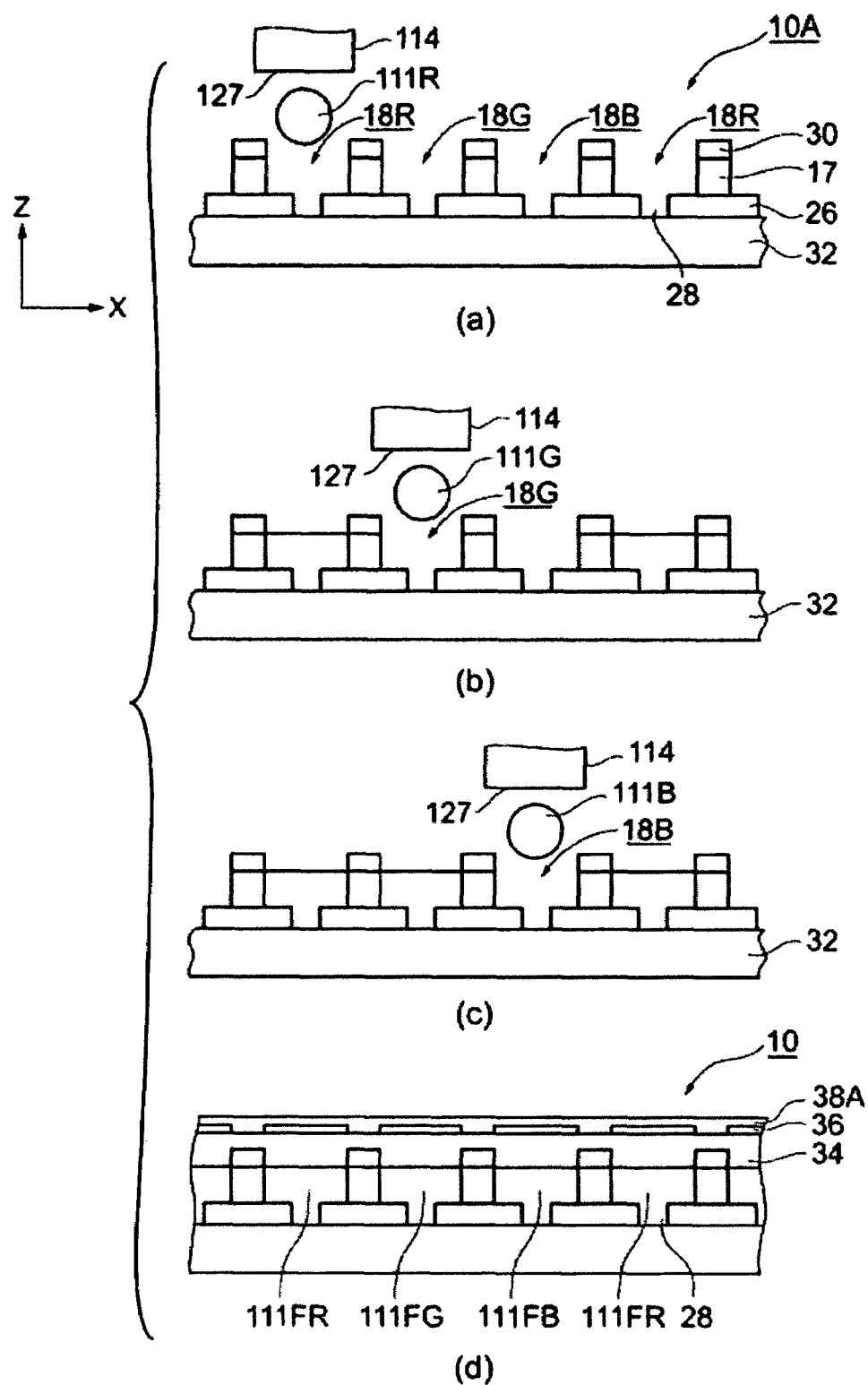
FIG. 14 is a schematic diagram illustrating the manufacturing method in accordance with the first embodiment of the present invention.

The substrate 10A on which the discharge receiving components 18R, 18G, and 18B have been formed is moved by the conveyance apparatus 170 to the stage 106 of the discharge apparatus 100R. As shown in FIG. 14a, the discharge apparatus 100R discharges the color filter material 111R from the discharge component 127 of the heads 114 so that a layer of color filter material 111R is formed on all of the discharge receiving components 18R. The method by which the discharge apparatus 100R performs the discharge of the color filter material 111R is the method described through reference to FIGS. 10, 11, and 12. When a layer of the color filter material 111R has been formed on all of the discharge receiving components 18R of the substrate 10A, the conveyance apparatus 170 positions the substrate 10A within a drying apparatus 150R. The filter layer 111FR is obtained on the discharge receiving components 18R by completely drying the color filter material 111R on the discharge receiving components 18R.

The conveyance apparatus 170 then positions the substrate 10A on the stage 106 of the discharge apparatus 100G. As shown in FIG. 14b, the discharge apparatus 100G discharges the color filter material 111G from the discharge component 127 of the heads 114 so that a layer of color filter material 111G is formed on all of the discharge receiving components 18G. The method by which the discharge apparatus 100G performs the discharge of the color filter material 111G is the method described through reference to FIGS. 10, 11, and 12. When a layer of the color filter material 111G has been formed on all of the discharge receiving components 18G of the substrate 10A, the conveyance apparatus 170 positions the substrate 10A within a drying apparatus 150G. A filter layer 111FG is obtained on the discharge receiving components 18G by completely drying the color filter material 111G on the discharge receiving components 18G.

The conveyance apparatus 170 then positions the substrate 10A on the stage 106 of the discharge apparatus 100B. As shown in FIG. 14c, the discharge apparatus 100B discharges the color filter material 111B from the discharge component 127 of the heads 114 so that a layer of color filter material 111B is formed on all of the discharge receiving components 18B. The method by which the discharge apparatus 100B performs the discharge of the color filter material 111B is the method described through reference to FIGS. 10, 11, and 12. When a layer of the color filter material 111B has been formed on all of the discharge receiving components 18B of the substrate 10A, the conveyance apparatus 170 positions the substrate 10A within a drying apparatus 150B. A filter layer 111FB is obtained on the discharge receiving components 18B by completely drying the color filter material 111B on the discharge receiving components 18B.

In this example, the bank 30 exhibits liquid repellency with respect to the liquid color filter materials 111R, 111G, and 111B. Further, the liquid repellency of the black matrix 17 with respect to the color filter materials 111R, 111G, and 111B is lower than the liquid repellency of the bank 30 with respect to the color filter materials 111R, 111G, and 111B. Actually, the black matrix 17 exhibits affinity to the liquid color filter materials 111R, 111G, and 111B. The reason for this is that a fluoropolymer is blended into the bank 30, whereas the black matrix 17 contains no fluoropolymer. In general, the surface of a resin containing fluorine exhibits higher liquid repellency with respect to the dispersion medium contained in the liquid color filter material than does the surface of a resin containing no fluorine. Most resins that do not contain fluorine exhibit affinity to the above-mentioned liquid materials.

With this example, since the bank 30 exhibits relatively high liquid repellency, the droplets of color filter material do not go over the bank 30 and flow outside the discharge receiving components 18R, 18G, and 18B immediately after landing on the discharge receiving components 18R, 18G, and 18B, and instead flow down toward the black matrix 17. Furthermore, since a layer that exhibits the desired liquid repellency and a layer that exhibits liquid affinity are formed, there is no need for a surface modification step in order to impart liquid repellency or liquid affinity to the black matrix 17 and the bank 30. For example, there is no need for an oxygen plasma treatment or a plasma treatment in which tetrafluoromethane is used as the treatment gas.

Next, the conveyance apparatus 170 positions the substrate 10A in the oven 160. After this, the oven 160 reheats (post-bakes) the filter layers 111FR, 111FG, and 111FB.

Next, the conveyance apparatus 170 positions the substrate 10A on the stage 106 of the discharge apparatus 100C. The discharge apparatus 100C discharges a liquid material so as to form the smoothing layer 34 that covers the filter layers 111FR, 111FG, and 111FB and the bank 30. After the smoothing layer 34 that covers the filter layers 111FR, 111FG, and 111FB and the bank 30 has been formed, the conveyance apparatus 170 positions the substrate 10A inside the oven 150C. After the oven 150C has completely dried the smoothing layer 34, the curing apparatus 165 heats and completely cures the smoothing layer 34.

Next, a plurality of electrodes 36 are formed on the smoothing layer 34, after which the orienting film 38A that covers the plurality of electrodes 36 and the smoothing layer 34 is provided, the result being that the substrate 10A becomes the color filter substrate 10 as shown in FIG. 14d.

Next, the color filter substrate 10 and a separately produced opposing substrate 12 are stuck together so that the orienting film 38A and the orienting film 38B are opposite each other on either side of a spacer. The space between the orienting films 38A and 38B is then filled with a liquid crystal material. The polarizers 20A and 20B are then provided to obtain the liquid crystal display device 11.

Second Embodiment

Figure 15:
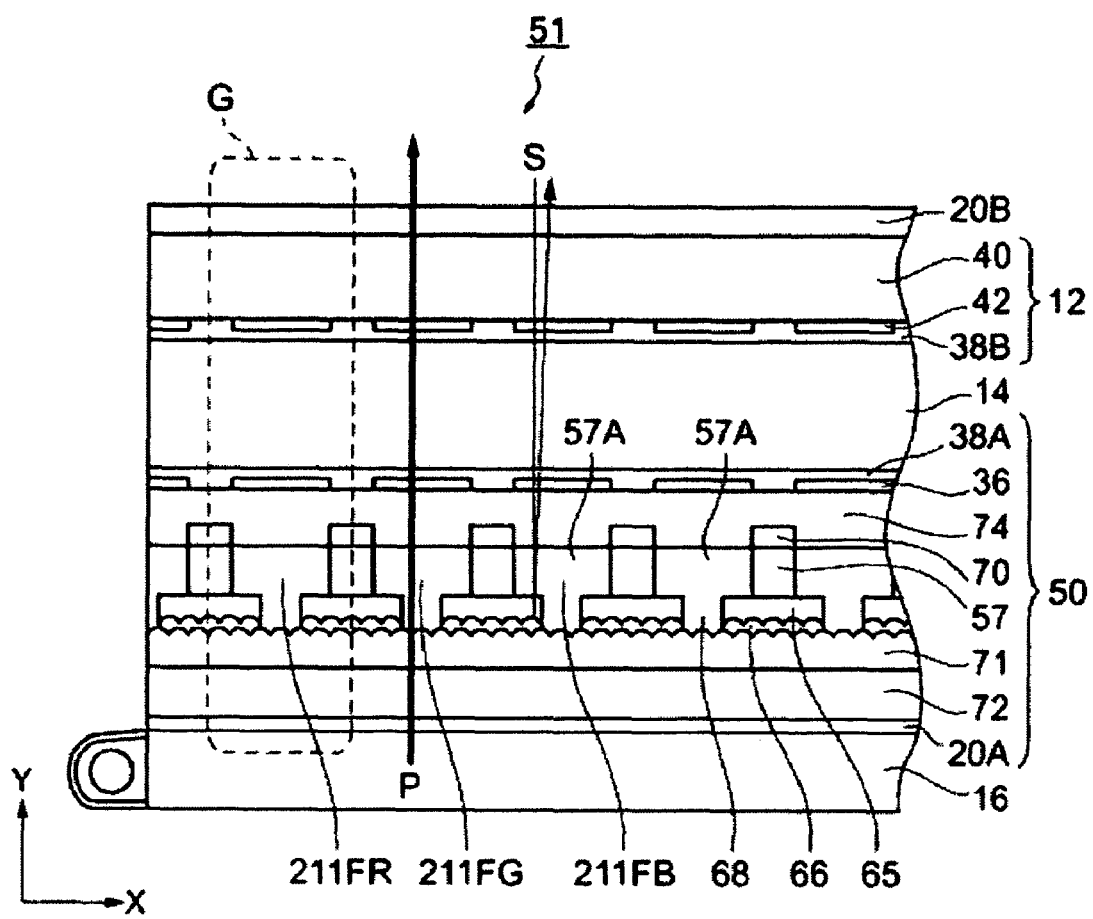
FIG. 15 is a schematic diagram illustrating the liquid crystal display device in accordance with the second embodiment of the present invention.
Figure 16:
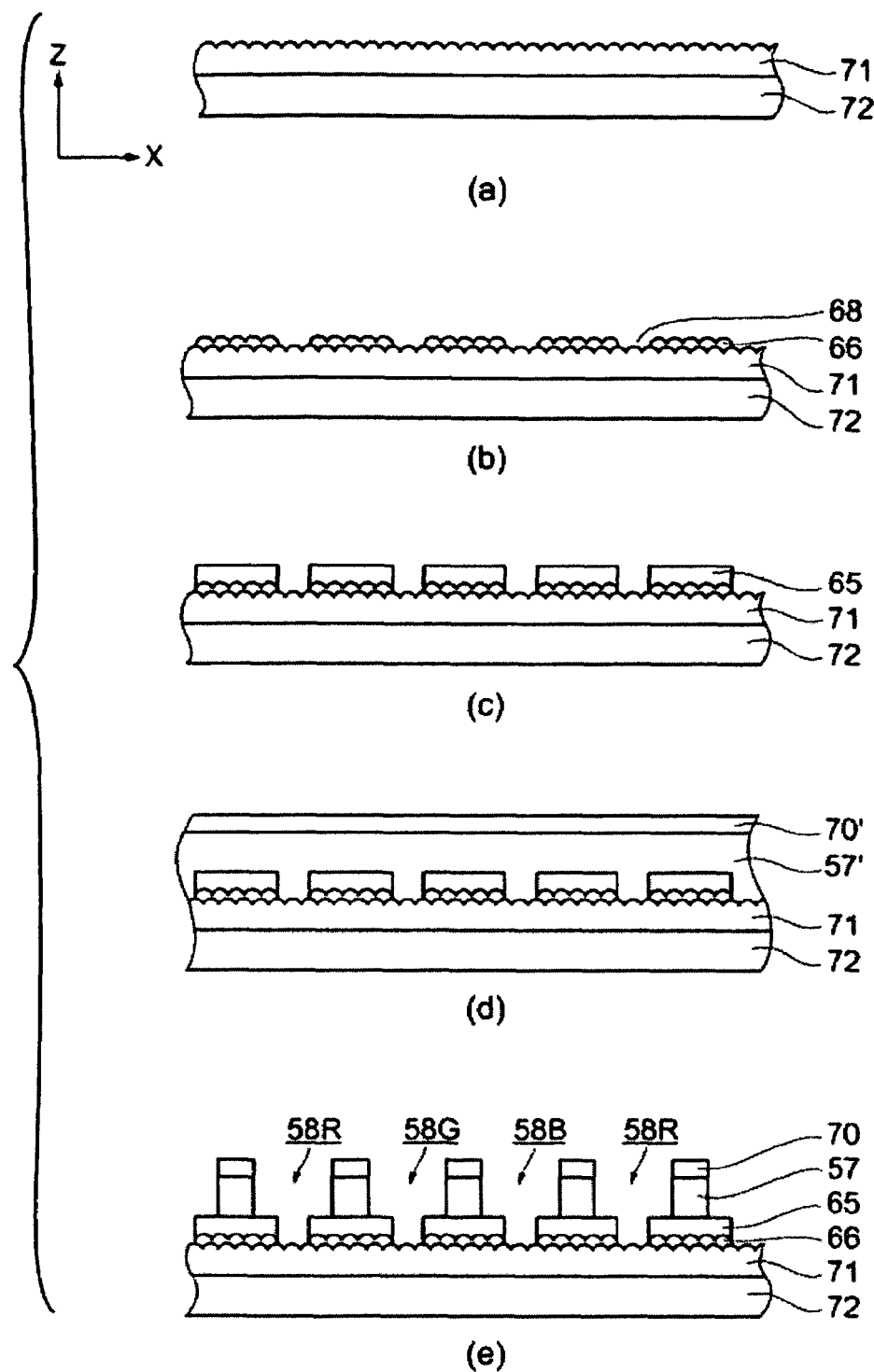
FIG. 16 is a schematic diagram illustrating the basic manufacturing apparatus in accordance with the second embodiment of the present invention.
Figure 17:
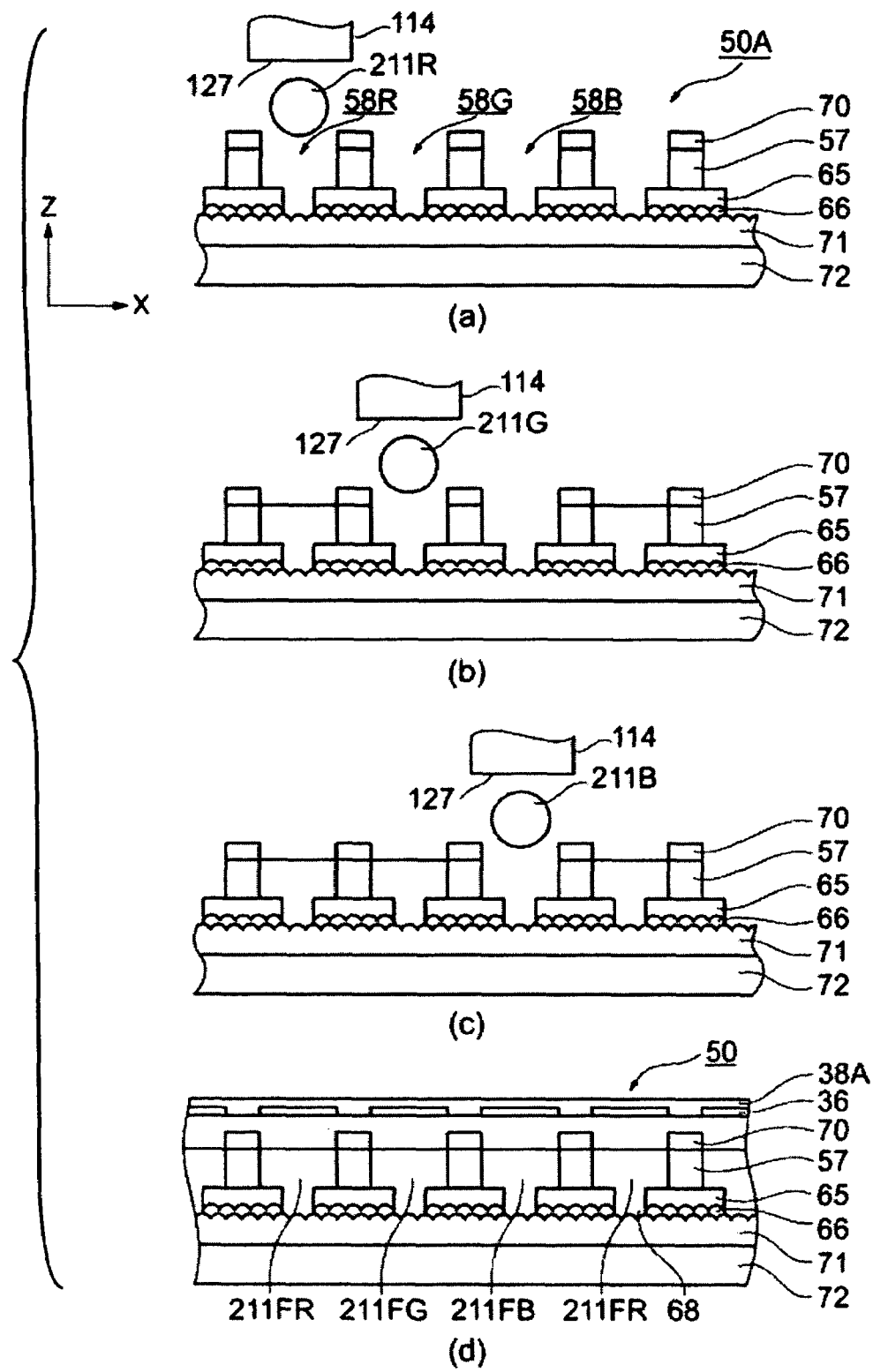
FIG. 17 is a schematic diagram illustrating the discharge method in accordance with the second embodiment of the present invention.

Referring now to FIG. 15-17, a liquid crystal device 51 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Liquid Crystal Display Device 51

The structure of a liquid crystal display device 51 of the second embodiment is substantially the same as the structure of the liquid crystal display device 11 of the first embodiment, except that the color filter substrate 10 used in the liquid crystal display device 11 of the first embodiment is replaced with a color filter substrate 50. In FIG. 15, those constituent elements that are the same as the constituent elements described in the first embodiment are given the same reference numbers, and redundant descriptions will be omitted here.

The liquid crystal display device 51 shown in FIG. 15 includes a polarizer 20A, a polarizer 20B, a color filter substrate 50, an opposing substrate 12, a liquid crystal layer 14, and a light source component 16. The liquid crystal layer 14 is positioned between the color filter substrate 50 and the opposing substrate 12. The color filter substrate 50 is positioned between the liquid crystal layer 14 and the light source component 16. The color filter substrate 50, the liquid crystal layer 14, and the opposing substrate 12 are positioned between the polarizer 20A and the polarizer 20B.

The color filter substrate 50 includes a translucent substrate 72, a resin scattering layer 71, a reflecting component 66, a transmitting component 68, an overcoat layer 65, a plurality of filter layers 211FR, 211FG, and 211FB, a black matrix 57, a bank 70, a smoothing layer 74, a plurality of electrodes 36, and an orienting film 38A. In this example, the position of the substrate 72 is between the polarizer 20A and the reflecting component 66 and transmitting component 68. The "color filter substrate" may have at least one filter layer. Therefore, the color filter substrate 50 may be defined so that the plurality of electrodes 36 and the orienting film 38A are not included in the color filter substrate 50.

The resin scattering layer 71 is provided so as to cover the substrate 72. The reflecting components 66 and the transmitting components 68 are positioned over the resin scattering layer 71. The reflecting components 66 and transmitting components 68 are both positioned in each of the regions corresponding to the plurality of filter layers 211FR, 211FG, and 211FB. In this example, the reflecting components 66 are an aluminum film, and the transmitting components 68 are openings in this film.

Irregular surfaces are provided to the resin scattering layer 71. Accordingly, irregular surfaces are also formed on the reflecting surfaces of the reflecting components 66, which are formed adjacent to the resin scattering layer 71. Because the reflecting surface has these irregular surfaces, the reflecting components 66 have the function of reflecting light in random directions.

The overcoat layer 65 is positioned over the reflecting components 66. The overcoat layer 65 is patterned in the same shape as the reflecting components 66. One of the purposes of providing the overcoat layer 65 is to lower the color purity of the reflected light.

The black matrix 57 is positioned over part of the overcoat layer 65. The black matrix 57 has a plurality of openings 57A. More specifically, the black matrix 57 is a light-blocking component having a shape that defines the plurality of openings 57A. The plurality of openings 57A are arranged in a matrix, and each of the openings 57A corresponds to a pixel region G. The black matrix 57 is an example of the "first layer" of the present invention.

Each of the plurality of filter layers 211FR, 211FG, and 211FB corresponds to one of three colors. More specifically, the filter layer 211FR is a filter corresponding to the color red, the filter layer 211FG is a filter corresponding to the color green, and the filter layer 211FB is a filter corresponding to the color blue. The plurality of filter layers 211FR, 211FG, and 211FB are respectively located in the plurality of openings 57A.

The bank 70 is formed over the black matrix 57. The plan view shape of the bank 70 is the same as the plan view shape of the black matrix 57. As will be described in detail below, the liquid repellency of the bank 70 with respect to the liquid color filter material used to form the filter layers 211FR, 211FG, and 211FB is greater than the liquid repellency of the black matrix 57 with respect to the color filter material. The bank 70 is an example of the "second layer" of the present invention.

The smoothing layer 74 is positioned so as to cover the bank 70 and the plurality of filter layers 211FR, 211FG, and 211FB. More specifically, the smoothing layer 74 covers the steps formed by the bank 70 and the filter layers 211FR, 211FG, and 211FB, so that a substantially flat surface is obtained. The plurality of electrodes 36 are positioned over the smoothing layer 74. The plurality of electrodes 36 are each in the form of a stripe extending in the Y axial direction (the direction orthogonal to the paper plane of FIG. 15), and are parallel to each other. The orienting film 38A is positioned so as to cover the plurality of electrodes 36 and the smoothing layer 74, and has undergone a rubbing treatment in a specific direction.

As discussed above, in the color filter substrate 50, the reflecting component 66 and transmitting component 68 are positioned corresponding to the filter layers 211FR, 211FG, and 211FB. The liquid crystal display device 51 having this color filter substrate 50 functions as follows.

When the backlight (the light source component 16) is used, light rays P from the backlight propagate through the polarizer 20A and the substrate 72, and then pass through the transmitting component 68. The light rays that have passed through the transmitting component 68 are incident on the filter layers 211FR, 211FG, and 211FB, and light rays of the corresponding wavelength bands are emitted from the filter layers 211FR, 2111FG, and 211FB. The light rays (colored light) from the filter layers 211FR, 211FG, and 211FB propagate through the liquid crystal layer 14 and the opposing substrate 12 and are emitted from the polarizer 20B. The intensity of the light rays from the backlight is modulated at the emission face of the polarizer 20B according to the voltage applied between the electrodes 36 and the electrodes 42.

Meanwhile, when external light is used, light rays S (external light, etc.) propagate through the polarizer 20B, the opposing substrate 12, and the liquid crystal layer 14, and are incident on the corresponding filter layers 211FR, 211FG, and 211FB. Of the light rays that have passed through the filter layers 211FR, 211FG, and 211FB and the overcoat layer 65, those that have been reflected by the reflecting component 66 once again propagate through the filter layers 211FR, 211FG, and 211FB and are emitted as light of the corresponding colors. Light of the various colors again propagates through the liquid crystal layer 14 and the opposing substrate 12 and is emitted from the polarizer 20B. The intensity of the light rays (external light, etc.) is modulated at the emission face of the polarizer 20B according to the voltage applied between the electrodes 36 and the electrodes 42.

The result of the above constitution is that first light rays that are incident from a first side in relation to the black matrix 57 and that pass through the corresponding filter layers 211FR, 211FG, and 211FB are reflected to the first side by the reflecting component 66. Meanwhile, second light rays that are incident from a second side in relation to the black matrix 57 are emitted to the first side through the transmitting component 68 and the corresponding filter layers 211FR, 211FG, and 211FB. The first side with respect to the black matrix 57 is the side where the smoothing layer 74 and the liquid crystal layer 14 are located. The second side with respect to the black matrix 57 is the side where the light source 16 is located.

Thus, the liquid crystal display device 51 is capable of displaying images by utilizing external light, as well as displaying images by utilizing light from a backlight. The liquid crystal display device 51 having this function is called a transflective display device.

The filter layers 211FR, 211FG, and 211FB in the color filter substrate 50 are applied by discharging a color filter material from an inkjet apparatus or other such discharge apparatus into the openings 57A of the black matrix 57.

In this example, the color filter substrate 50 prior to the provision of the filter layers 211FR, 211FG, and 211FB is sometimes referred to as the "substrate 50A." Also in this example, the regions where the filter layers 211FR, 211FG, and 211FB are to be provided are sometimes referred to as "discharge receiving components 58R, 58G, and 58B." With this notation, in the case of this example, the recesses in the substrate 50A surrounded by the bank 70, the black matrix 57, the reflecting component 66, and the transmitting component 68 correspond to the discharge receiving components 58R, 58G, and 58B. The discharge receiving components 58R, 58G, and 58B are also sometimes referred to as "targets."

Method of Manufacturing Liquid Crystal Display Device 51

The method of manufacturing the liquid crystal display device 51 will now be described.

First, the reflecting component 66 and the transmitting component 68 are formed on a translucent member. More specifically, as shown in FIG. 16a, a polyimide or other such translucent resin layer is formed by sputtering or another such method so as to cover substantially the entire surface of the translucent substrate 72 (such as a glass substrate), after which bumps are randomly applied to the surface of the resin layer by blasting. This yields the resin scattering layer 71. The resin scattering layer 71 corresponds to the "translucent member" in the present invention. Then, an aluminum (Al) film is formed by sputtering or another such method over the resin scattering layer 71. As shown in FIG. 16b, the above-mentioned aluminum film is patterned so as to form the reflecting component 66 and the transmitting component 68 in each pixel region G. The aluminum film remaining on the resin scattering layer 71 after patterning becomes the reflecting component 66, while the portion from which the aluminum film has been removed becomes the transmitting component 68. The reflecting component 66 and the transmitting component 68 are formed in this manner on the translucent member.

Then, as shown in FIG. 16c, an overcoat layer is applied so as to cover the reflecting component 66 and the resin scattering layer 71, and is patterned in the same shape as the reflecting component 66. As a result, the overcoat layer 65 is obtained on the reflecting component 66.

Next, a layer of a first material is formed covering the reflecting component 66 and the transmitting component 68. More specifically, as shown in FIG. 16d, a heat-curing acrylic resin (resin black) in which a black pigment has been dispersed is applied in a thickness of about 3 μm so as to cover the overcoat layer 65 and the openings in the overcoat layer 65 (that is, the openings in the reflecting component 66). The result is a resin black layer 57'. The resin black layer 57' here corresponds to the "layer of a first material" in the present invention.

A layer of a second material is then formed by coating the first material layer with a resist. More specifically, as shown in FIG. 16d, a negative, acrylic-based, chemically amplified, photosensitive resist into which a fluoropolymer has been blended is applied so as to cover substantially the entire surface of the resin black layer 57'. As a result, a resist layer 70' is obtained over the resin black layer 57'. The resist layer 70' here is an example of the "layer of a second material" in the present invention.

The resist layer 70' and the resin black layer 57' are then patterned. More specifically, the resist layer 70' is irradiated with light hv through a photomask having a light-blocking component in the regions where the pixel regions G are to be formed. Etching is then performed with a predetermined etching fluid to remove a plurality of portions not irradiated with the light hv, namely, the resin black layer 57' and the resist layer 70' in the plurality of portions corresponding to the plurality of pixel regions G. The result of this is that as shown in FIG. 16e, the black matrix 57 and the bank 70, which are shaped so as to surround the filter layers to be subsequently formed, are simultaneously obtained on the substrate 72. In other words, the openings 57A corresponding to the reflecting component 66 and the transmitting component 68 are obtained.

As discussed above, the regions defined by the black matrix 57, the bank 70, the overcoat layer 65, and the transmitting component 68 are the discharge receiving components 58R, 58G, and 58B. The bank 70 is translucent. Also, as mentioned above, the black matrix 57 is an example of the "first layer" in the present invention, while the bank 70 is an example of the "second layer."

Thus, regions demarcated by the black matrix 57 and the bank 70 (that is, the discharge receiving components 58R, 58G, and 58B) are provided to the substrate 50A by forming the black matrix 57, which is located on the substrate 72, and the bank 70, which is located on the black matrix 57.

The substrate 50A on which the discharge receiving components 58R, 58G, and 58B have been formed is moved by the conveyance apparatus 170 (FIG. 2) to the stage 106 of the discharge apparatus 100R. As shown in FIG. 17a, the discharge apparatus 100R discharges the color filter material 211R from the heads 114 so that a layer of color filter material 211R is formed on all of the discharge receiving components 58R. The method by which the discharge apparatus 100R performs the discharge of the color filter material 211R is the method described through reference to FIGS. 10, 11, and 12. When a layer of the color filter material 211R has been formed on all of the discharge receiving components 58R of the substrate 50A, the conveyance apparatus 170 positions the substrate 50A within the drying apparatus 150R. The filter layer 211FR is obtained on the discharge receiving components 58R by completely drying the color filter material 211R on the discharge receiving components 58R.

The conveyance apparatus 170 then positions the substrate 50A on the stage 106 of the discharge apparatus 100G. As shown in FIG. 17b, the discharge apparatus 100G discharges the color filter material 211G from the heads 114 so that a layer of color filter material 211G is formed on all of the discharge receiving components 58G. The method by which the discharge apparatus 100G performs the discharge of the color filter material 211G is the method described through reference to FIGS. 10, 11, and 12. When a layer of the color filter material 211G has been formed on all of the discharge receiving components 58G of the substrate 50A, the conveyance apparatus 170 positions the substrate 50A within the drying apparatus 150G. A filter layer 211FG is obtained on the discharge receiving components 58G by completely drying the color filter material 211G on the discharge receiving components 58G.

The conveyance apparatus 170 then positions the substrate 50A on the stage 106 of the discharge apparatus 100B. As shown in FIG. 17c, the discharge apparatus 100B discharges the color filter material 211B from the heads 114 so that a layer of color filter material 211B is formed on all of the discharge receiving components 58B. The method by which the discharge apparatus 100B performs the discharge of the color filter material 211B is the method described through reference to FIGS. 10, 11, and 12. When a layer of the color filter material 211B has been formed on all of the discharge receiving components 58B of the substrate 50A, the conveyance apparatus 170 positions the substrate 50A within the drying apparatus 150B. A filter layer 211FB is obtained on the discharge receiving components 58B by completely drying the color filter material 211B on the discharge receiving components 58B.

In this example, the bank 70 exhibits liquid repellency with respect to the liquid color filter materials 211R, 211G, and 211B. Further, the liquid repellency of the black matrix 57 with respect to the color filter materials 211R, 211G, and 211B is lower than the liquid repellency of the bank 70 with respect to the color filter materials 211R, 211G, and 211B. Actually, the black matrix 57 exhibits affinity to the liquid color filter materials 211R, 211G, and 211B. The reason for this is that a fluoropolymer is blended into the bank 70, whereas the black matrix 57 contains no fluoropolymer. In general, the surface of a resin containing fluorine exhibits higher liquid repellency with respect to the dispersion medium contained in the liquid color filter material than does the surface of a resin containing no fluorine. Most resins that do not contain fluorine exhibit affinity to the above-mentioned liquid materials.

With this example, since the bank 70 exhibits relatively high liquid repellency, the droplets of color filter material do not go over the bank 70 and flow outside the discharge receiving components 58R, 58G, and 58B immediately after landing on the discharge receiving components 58R, 58G, and 58B, and instead flow down toward the black matrix 57. Furthermore, since a layer that exhibits the desired liquid repellency and a layer that exhibits liquid affinity are formed, there is no need for a surface modification step in order to impart liquid repellency or liquid affinity to the black matrix 57 and the bank 70. For example, there is no need for an oxygen plasma treatment or a plasma treatment in which tetrafluoromethane is used as the treatment gas.

Next, the conveyance apparatus 170 positions the substrate 50A in the oven 160. After this, the oven 160 reheats (post-bakes) the filter layers 211FR, 211FG, and 211FB.

Next, the conveyance apparatus 170 positions the substrate 50A on the stage 106 of the discharge apparatus 100C. The discharge apparatus 100C discharges a liquid protective film material so as to form the smoothing layer 74 that covers the filter layers 211FR, 211FG, and 211FB and the bank 70. After the smoothing layer 74 that covers the filter layers 211FR, 211FG, and 211FB and the bank 70 has been formed, the conveyance apparatus 170 positions the substrate 50A inside the oven 150C. After the oven 150C has completely dried the smoothing layer 74, the curing apparatus 165 heats and completely cures the smoothing layer 74.

Next, a plurality of electrodes 36 are formed on the smoothing layer 74, after which the orienting film 38A that covers the plurality of electrodes 36 and the smoothing layer 74 are provided, the result being that the substrate 50A becomes the color filter substrate 50 as shown in FIG. 17d.

Next, the color filter substrate 50 and a separately produced opposing substrate 12 are stuck together so that the orienting film 38A and the orienting film 38B are opposite each other on either side of a spacer. The space between the orienting films 38A and 38B is then filled with a liquid crystal material. The polarizers 20A and 20B are then provided to obtain the liquid crystal display device 51.

Third Embodiment

Examples of electronic devices equipped with the liquid crystal display devices of the first and second embodiments will now be described.

Figure 18:
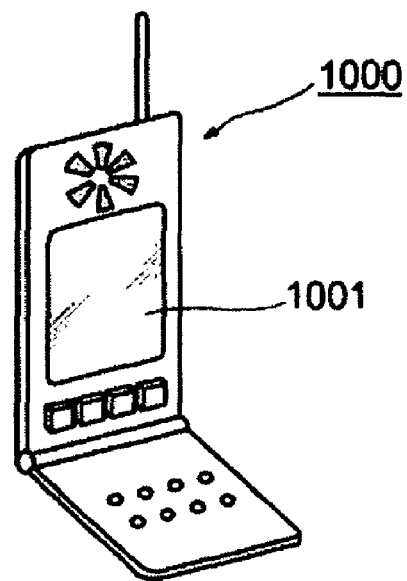
FIG. 18 is a schematic diagram illustrating the mobile telephone in accordance with the third embodiment of the present invention.

FIG. 18 is an oblique view of an example of a mobile telephone. As shown in FIG. 18, this mobile telephone 1000 is equipped with a liquid crystal display component 1001. Either the liquid crystal display device 11 or the liquid crystal display device 51 can be applied to the liquid crystal display component 1001.

Figure 19:
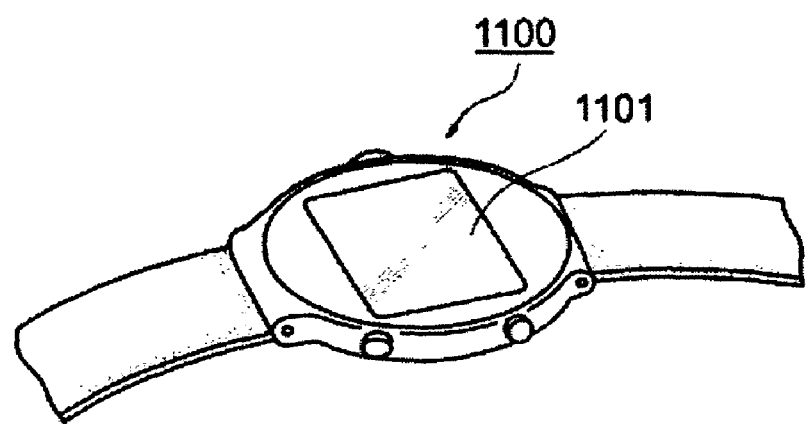
FIG. 19 is a schematic diagram illustrating the wrist-watch-style data processor in accordance with the third embodiment of the present invention.

FIG. 19 is an oblique view of an example of a wristwatch-style electronic device. In FIG. 19, a watch unit 1100 is equipped with a liquid crystal display component 1101. Either the liquid crystal display device 11 or the liquid crystal display device 51 can be applied to the liquid crystal display component 1101.

Figure 20:
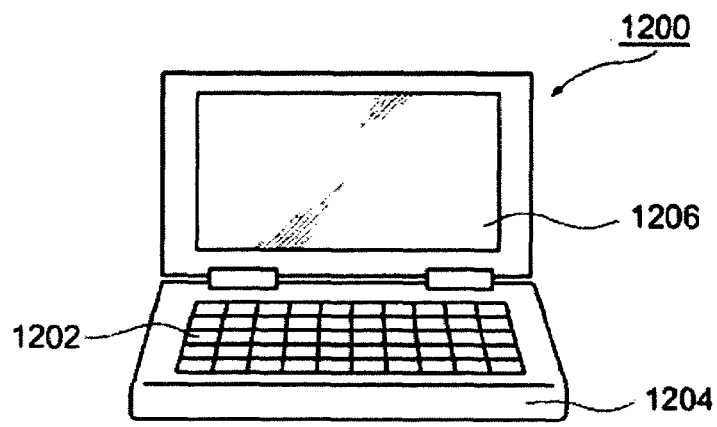
FIG. 20 is a schematic diagram illustrating the portable data processor in accordance with the third embodiment of the present invention.

FIG. 20 is an oblique view of an example of a portable data processor such as a personal computer. In FIG. 20, a data processor 1200 is equipped with an input component 1202 such as a keyboard, a data processor unit 1204, and a liquid crystal display component 1206. Either the liquid crystal display device 11 or the liquid crystal display device 51 can be applied to the liquid crystal display component 1206.

Because the electronic devices shown in FIGS. 18 to 20 are equipped with a liquid crystal display component featuring the liquid crystal display device of one of the above first and second embodiments, color expression is good both in reflection mode and transmission mode, the result being an electronic device equipped with a liquid crystal display component with excellent visibility.

Figure 21:
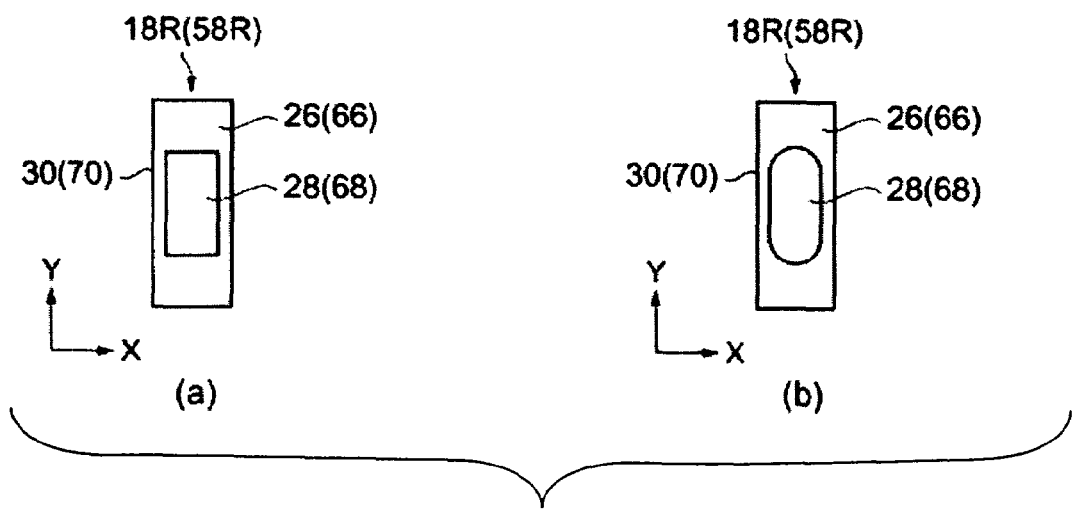
FIG. 21 is a schematic diagram illustrating the shape of the transmitting component in accordance with an alternate embodiment of the present invention.

Modification to First to Third Embodiments (a) In the first through third embodiments, the shape of the transmitting component 28 and the transmitting component 68 was rectangular (FIG. 21(*a*)). However, the shape of the transmitting component 28 and the transmitting component 68 is not limited to rectangular, and may instead be circular or elliptical, and may be the oval shape shown in FIG. 21*b*. Since the transmitting components 28 and 68 are recesses formed in the reflecting components 26 and 66, if there are no acute angles in the shape of the transmitting components 28 and 68, the liquid material will spread out and completely cover the interior of the transmitting components 28 and 68.

(b) The color filter substrates of the above first and second embodiments were applied to liquid crystal display devices, but the color filter substrates of first and second embodiments may also be applied to electronic devices other than liquid crystal display devices. The term "electronic device" as used in this specification includes plasma display devices, liquid crystal display devices, electroluminescence display devices, FEDs (Field Emission Displays), SEDs (Surface-conduction Electron-emitter Displays), and so forth. FEDs and SEDs are also called image display devices equipped with electron emitting elements.

Since color purity can be further enhanced without the electronic device performing transflective display, the color filter substrates of the present invention can be used to advantage in a variety of electronic devices.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-304659, 2003-304566, 2004-178378. The entire disclosure of Japanese Patent Applications Nos. 2003-304659, 2003-304566, 2004-178378 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method of manufacturing a color filter substrate, comprising:
   providing a light-transmissive base;
   providing a reflecting component and a transmitting component over the light-transmissive base;
   forming a first layer covering the reflecting component and transmitting component with a first material;
   forming a second layer by coating the first layer with a resist;
   patterning the first layer and the second layer by exposing the second layer such that the first layer has openings corresponding to the transmitting component; and
   discharging a liquid color filter material into the openings formed by the patterned first and second layers.

2. The method according to claim 1, wherein
   the forming of the first layer includes forming a black matrix as the first layer.

3. The method according to claim 1, wherein
   the providing of the reflecting component includes providing the reflecting component with a light scattering surface.

4. The method according to claim 3, further comprising:
providing a light-transmissive base; and
providing a resin layer that is positioned on the first side of the light-transmissive base and has an irregular surface,
the providing of the reflecting component including forming the light scattering surface of the reflecting component adjacent to the irregular surface of the resin layer.

5. The method according to claim 1, wherein
the forming of the first and second layers includes forming the first and second layers such that a liquid repellency of the second layer with respect to the liquid color filter material is greater than a liquid repellency of the first layer with respect to the liquid color filter material.

6. The method according to claim 5, wherein
the forming of the first layer includes forming the first layer such that the first layer exhibits affinity to the liquid color filter material.

7. The method according to claim 1, wherein the forming of the second layer includes coating the first layer with the resist that includes a fluorine-based polymer.

8. The method according to claim 1, further comprising
providing an overcoat layer located on the first side of the reflecting component,
the discharging of the liquid color filter material includes discharging the liquid color filter material on the first side of the overcoat layer and within the transmitting component.

* * * * *